United States Patent [19]

Hoda et al.

[11] Patent Number: 4,588,272

[45] Date of Patent: *May 13, 1986

[54] FILM CARTRIDGES, FILMS AND CAMERAS ADAPTED FOR USE THEREWITH

[75] Inventors: Takeo Hoda, Sakai; Nobuyuki Taniguchi, Tondabayashi; Kiyoshi Seigenji, Sakai, all of Japan

[73] Assignee: Minolta Camera Kabushiki Kaisha, Osaka, Japan

[*] Notice: The portion of the term of this patent subsequent to Feb. 14, 2001 has been disclaimed.

[21] Appl. No.: 546,537

[22] Filed: Oct. 28, 1983

Related U.S. Application Data

[63] Continuation of Ser. No. 385,311, Jun. 4, 1982, Pat. No. 4,431,283.

[30] Foreign Application Priority Data

Jun. 8, 1981 [JP] Japan .................. 56-88625

[51] Int. Cl.$^4$ .............................. G03B 7/24
[52] U.S. Cl. ..................... 354/21; 352/78 C
[58] Field of Search ............... 354/21, 410; 352/78 C

[56] References Cited

U.S. PATENT DOCUMENTS

| | | | |
|---|---|---|---|
| 3,165,990 | 1/1965 | Kiper et al. | 354/58 |
| 4,024,557 | 5/1977 | Aoyama et al. | 354/21 X |
| 4,103,308 | 7/1978 | Sakurada et al. | 354/23 D$n |
| 4,431,283 | 2/1984 | Hoda et al. | 354/21 |

FOREIGN PATENT DOCUMENTS 5785053  5/1982  Japan ........................ 354/21

OTHER PUBLICATIONS

Kodak Research Disclosure, No. 192, Apr. 1980, p. 142.

Primary Examiner—L. T. Hix
Assistant Examiner—David M. Gray
Attorney, Agent, or Firm—Watson, Cole, Grindle & Watson

[57] ABSTRACT

Disclosed are film cartridges having improved digital code patterns, films having improved digital signal means, and cameras devices adapted for use with the film cartridges or the films. The improved code patterns include bits with different weights and a bit which is made conductive with at least one of the bits with the different weights.

One of the cameras devices is provided with a reading device on a spool so that the reading device can continuously read the signal means at a front tip of a leader portion of the film throughout the duration in which the film is wound around the spool. Another camera device is adapted to read the code patterns on the film cartridge upon insertion of the film cartridge into a cartridge chamber. Various camera circuits are proposed, in one of which decimal or fractional APEX values of read film speeds are converted to outputs with weights of $\frac{1}{2}$, $\frac{1}{4}$ and $\frac{1}{8}$ for digital calculation and in another of which film speeds divided by $\frac{1}{3}$ Ev steps are automatically set by being grouped into one of high, middle and low film speed ranges.

17 Claims, 28 Drawing Figures

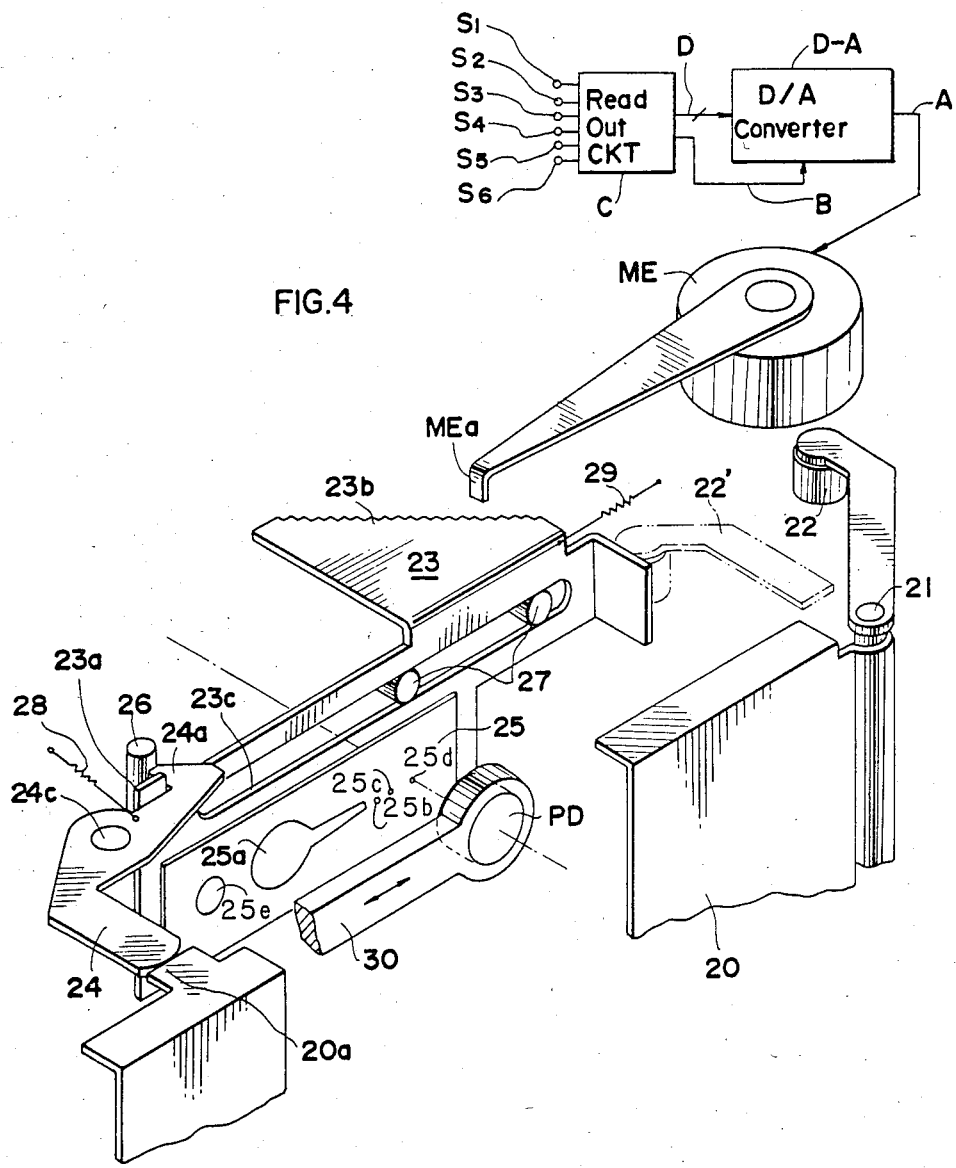

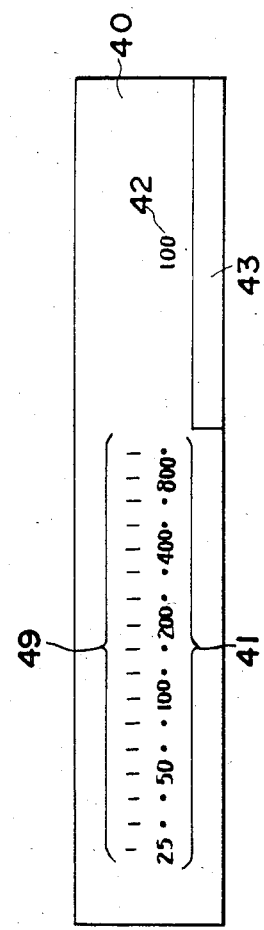
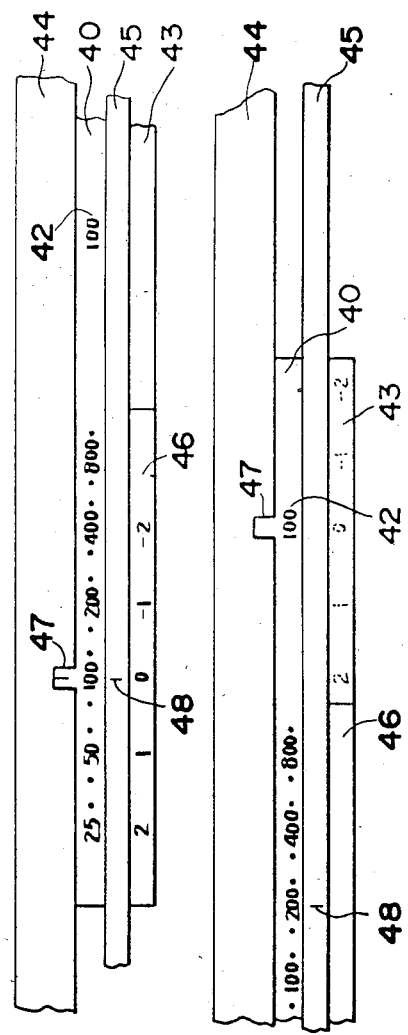
FIG.5(a)
FIG.5(b)
FIG.5(c)

FILM CARTRIDGES, FILMS AND CAMERAS ADAPTED FOR USE THEREWITH

This is a continuation of application Ser. No. 385,311 filed June 4, 1982, now U.S. Pat. No. 4,431,283.

BACKGROUND OF THE INVENTION

1. Field of the Invention

The present invention relates to film cartridges and films which have digital code patterns representing information of the films and to cameras which are adapted for use with such film cartridges or films.

2. Description of the Prior Arts

Various film cartridges and films of the above described type and cameras adapted for use therewith are known by, for example, U.S. Pat. Nos. 4,024,557 and 4,200,371 and RESEARCH DISCLOSURE April 1980 Number 192 particularly on page 142.

The prior art film cartridges, films and cameras are advantageous in that it is made possible to automatically read out and set the information on the film cartridges or on the films. However, there are the following problems which are left unsolved.

(a) With prior art cameras in which sensing or detecting contacts are fixedly provided in a cartridge chamber, insertion of a film cartridge into the chamber is possible disturbed by the contacts. With other type prior art cameras in which sensing or detecting contacts project into a cartridge chamber in association with closure of a camera back cover against a spring bias, the back cover must be opened again troubling the camera user where a film cartridge containing a film whose film speed is not consistent with that intended by the camera user is inserted into the chamber causing the camera to indicate such unintended film speed.

(b) With prior art film cartridges having a digital code pattern representing film information such as film speed, the code pattern is designed only by numbering film speeds low to high by using binary codes, so that outputs from a reading device must be decoded in cameras.

(c) With prior art films having a digital code pattern with perforated and non-perforated areas at its leader portion and with prior art cameras which read the patterns at an exposure station, a memory device is required which memorizes outputs from a reading device even after the leading portion of the film has passed the exposure station. Additionally, where the reading device is provided on a camera back cover or on a film pressure plate electric connection between the reading device and circuits within a camera body becomes troublesome.

(d) Film speeds are divided by $\frac{1}{3}$ EV steps according to the APEX system while it is usual for digital calculations to put weights of $\frac{1}{2}$, $\frac{1}{4}$ and $\frac{1}{8}$ on decimal or fractional bits. Thus, decimal APEX values of film speeds are not suited for digital calculations to be effected in camera circuits such as an exposure control circuit.

(e) Furthermore, it is not always necessary but rather useless for armature cameras to set film speeds by $\frac{1}{3}$ EV steps since such armature cameras are usually designed to control an exposure with a few predetermined steps allowing occurrence of little errors.

(f) With prior art film cartridges having digital code patterns shown in FIG. 2, all bits of the code patterns representing film speeds have different weights. More particularly, the patterns include a first bit conductive for all film speeds and second to sixth bits conductive and nonconductive in dependence upon the film speeds and the second to sixth bits have weights of 4, 2, 1, $\frac{2}{3}$ and $\frac{1}{3}$ respectively. However, the code pattern representing ASA or ISO 25 is designed such that only the first bit is conductive. This makes it necessary to provide two contacts for detecting the condition of the first bit and therefore the film cartridge having the code pattern of ASA or ISO 25 cannot be discriminated from an ordinary film cartridge having no such code patterns in case space inside a camera body does not allow to arrange two contacts for the first bit.

SUMMARY OF THE INVENTION

It is a general object of the present invention to provide film cartridges, films and cameras adapted therefor, which can solve one or more of the above problems of the prior art involving the representation of digitally coded information.

The above and other objects of the present invention will become apparent from the following description of preferred embodiments of the present invention taken in conjunction with the accompanying drawings.

BRIEF DESCRIPTION OF THE DRAWINGS

FIG. 4 is a schematic perspective illustration of a mechanism of the camera that adjusts the aperture for a light measuring element in accordance with a read film speed;

FIGS. 5(a), 5(b) and 5(c) are plan schematic illustrations of an indicating means corresponding to the mechanism of FIG. 4;

DESCRIPTION OF THE PREFERRED EMBODIMENTS

Figure 1:
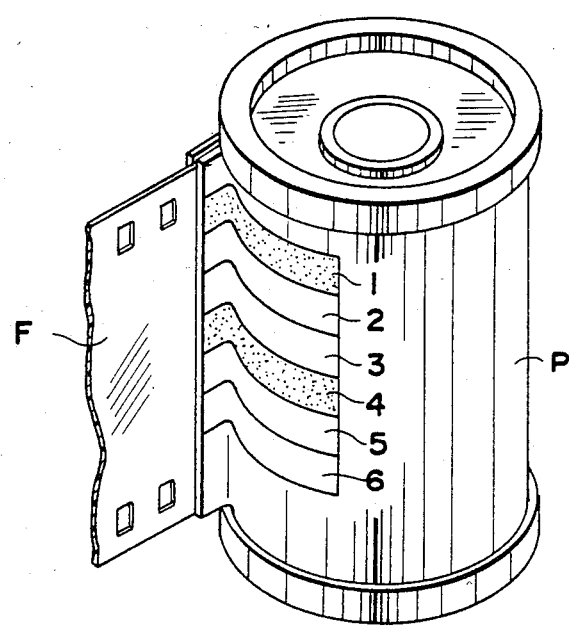
FIG. 1 is a perspective view of a prior art film cartridge.

The film cartridge shown in FIG. 1 is a type that has been proposed, and is provided with code areas 1 through 6, which bear in combination a digitally coded signal representative of film sensitivity. Of the code areas 1 through 6, the areas 1 and 4 are made electrically conductive in the embodiment shown.

Figure 2:
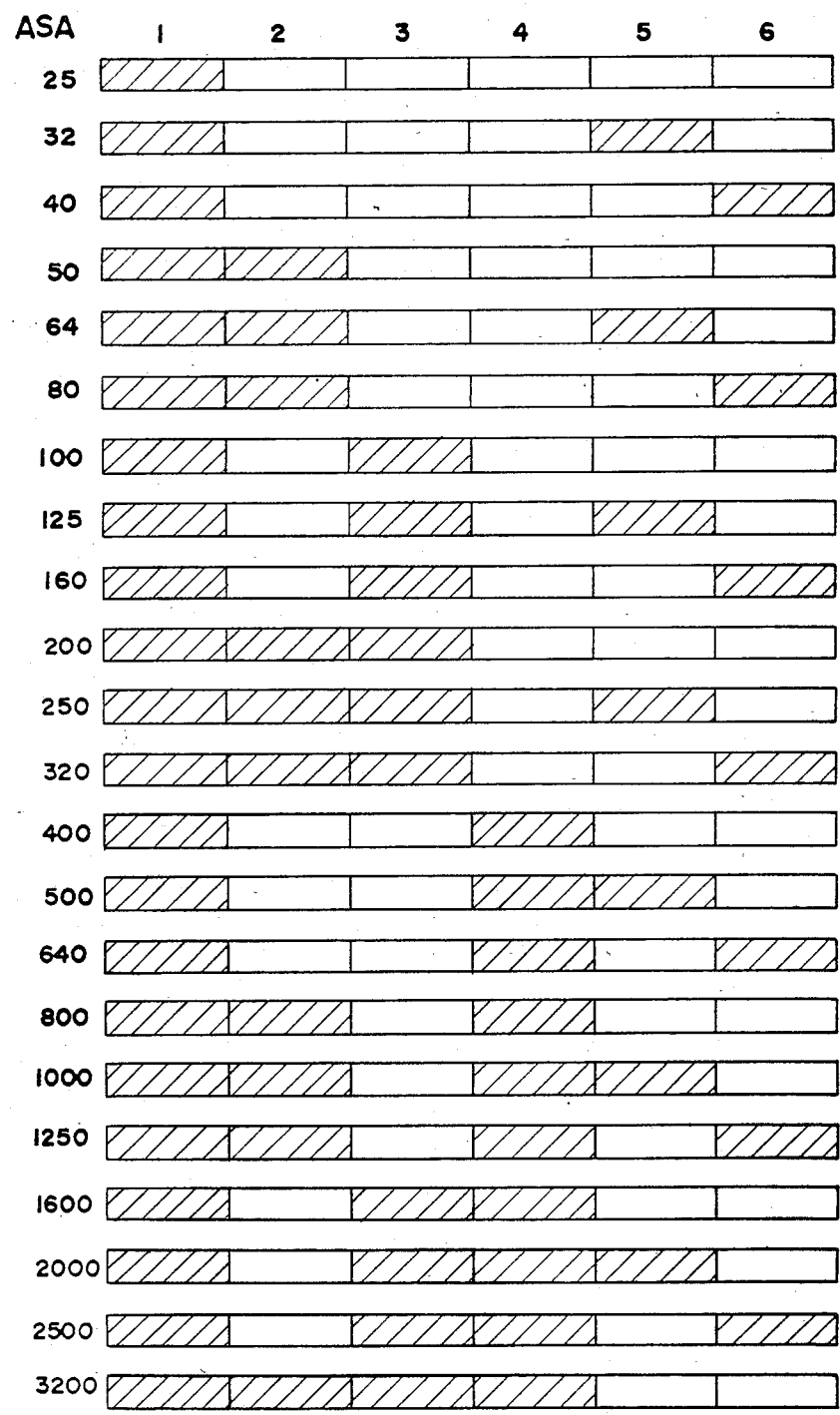
FIG. 2 shows codes that have been proposed for the cartridge shown in FIG. 1.

FIG. 2 shows the correspondence between code patterns and film sensitivity values in ASA units as proposed with reference to the structure shown in FIG. 1. In each pattern, the hatched portions show conductive portions or strips and the blank portions show non-conductive portions or strips. Accordingly, if it is designed that the conductive portion represents a digital signal "1", the code patterns in FIG. 2 will correspond to digital signals as shown in Table 1.

TABLE 1

| ASA | Sv | 4 | 3 | 2 | 6 | 5 |
|---|---|---|---|---|---|---|
| 25 | 3 | 0 | 0 | 0 | 0 | 0 |
| 32 | 3⅓ | 0 | 0 | 0 | 0 | 1 |
| 40 | 3⅔ | 0 | 0 | 0 | 1 | 0 |
| 50 | 4 | 0 | 0 | 1 | 0 | 0 |
| 64 | 4⅓ | 0 | 0 | 1 | 0 | 1 |
| 80 | 4⅔ | 0 | 0 | 1 | 1 | 0 |
| 100 | 5 | 0 | 1 | 0 | 0 | 0 |
| 125 | 5⅓ | 0 | 1 | 0 | 0 | 1 |
| 160 | 5⅔ | 0 | 1 | 0 | 1 | 0 |
| 200 | 6 | 0 | 1 | 1 | 0 | 0 |
| 250 | 6⅓ | 0 | 1 | 1 | 0 | 1 |
| 320 | 6⅔ | 0 | 1 | 1 | 1 | 0 |
| 400 | 7 | 1 | 0 | 0 | 0 | 0 |
| 500 | 7⅓ | 1 | 0 | 0 | 0 | 1 |
| 640 | 7⅔ | 1 | 0 | 0 | 1 | 0 |
| 800 | 8 | 1 | 0 | 1 | 0 | 0 |
| 1000 | 8⅓ | 1 | 0 | 1 | 0 | 1 |
| 1250 | 8⅔ | 1 | 0 | 1 | 1 | 0 |
| 1600 | 9 | 1 | 1 | 0 | 0 | 0 |
| 2000 | 9⅓ | 1 | 1 | 0 | 0 | 1 |
| 2500 | 9⅔ | 1 | 1 | 0 | 1 | 0 |
| 3200 | 10 | 1 | 1 | 1 | 0 | 0 |

As will be seen from the Table 1, encoded portion 5 has a weight corresponding to ⅓ EV and encoded portion 6 has a weight corresponding to ⅔ EV when the weights are measured in terms of EV value (exposure value) according to the APEX notation. Further, encoded portion 2 has a weight corresponding to 1 EV, encoded portion 3 to 2 EV and encoded portion 4 to 4 EV. The integer portion of speed value SV of the film sensitivity is obtained by adding 3 EV to the EV value given by the encoded portions 2, 3 and 4.

Figure 3:
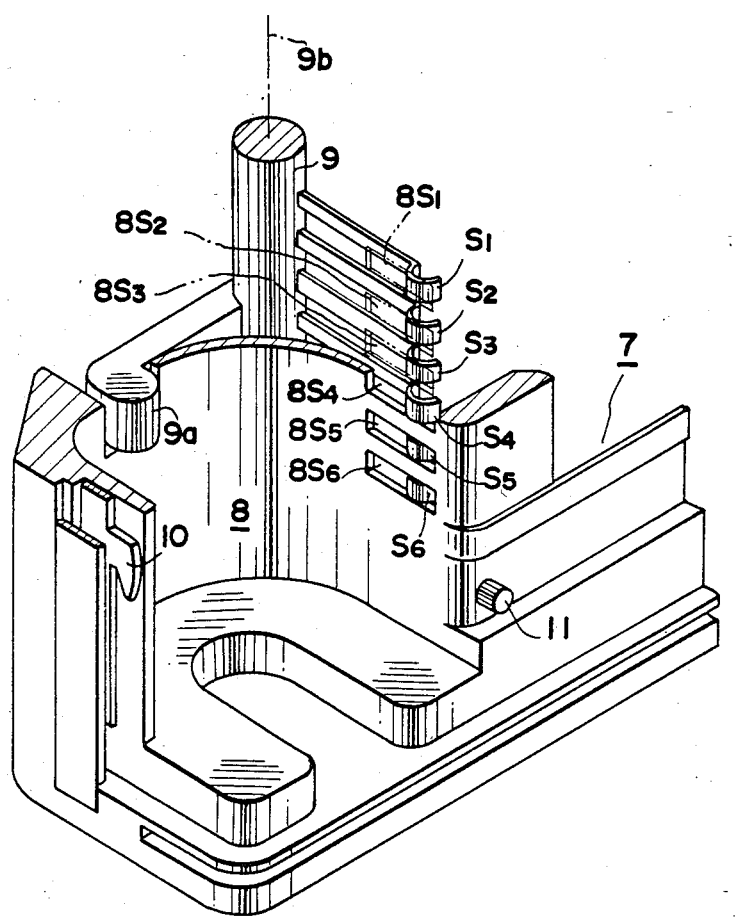
FIG. 3 is a fragmentary perspective view of a cartridge chamber of a camera according to the present invention that is adapted to receive the cartridge shown in FIG. 1.

FIG. 3 shows in perspective view and partly in cross section, a film sensitivity signal reading portion of a camera according to an embodiment of the present invention. and which is adapted for the film cartridge shown in FIG. 1. Cartridge chamber 8 is formed on one side of exposure aperture 7. Contact holder 9 supports a group of electric contacts S1 through S6 and is provided with a detector member 9a for detecting whether a film cartridge P is in cartridge chamber 8. Holder 9 is rotatable about axis 9b and urged in the counterclockwise direction so that, when no cartridge is in the chamber, detector member 9a protrudes in the chamber with the set of contacts S1 to S6 retracting respectively through container apertures 8S1 to 8S6. Lock portion 10 locks the camera rear cover and pin 11 restricts the vertical position of the film relative to exposure aperture 7.

When film cartridge P as shown in FIG. 1 is put into cartridge chamber 8, detector member 9a is pushed by the film cartridge against the force of the spring so that contact holder 9 rotates in the clockwise direction around axis 9b to allow projection of the set of contacts S1 to S6 through container apertures 8S1 to 8S6 into the chamber such that the contacts come in contact with en-coded areas 1 to 6, thereby producing signals from contacts S1 and S4 that are in contact with conductive strips 1 and 4. The process of treating the signals will be described later.

FIG. 4 is a perspective view of a film sensitivity setting device that may be used with the film cartridge mentioned above. Camera rear cover 20 is provided with charging (or tensioning) means 22, which is corotatable with rear cover 22 about pin or shaft 21. Aperture setting member 23 supports aperture plate 25, which is formed with apertures 25a, 25b, 25c, 25d and 25e of different sizes and shapes. Aperture plate 25 is disposed in front of light receiving element PD and is moved laterally with aperture setting member 23 for setting the aperture for the light measurement in accordance with film sensitivity. Of the apertures of aperture plate 25, aperture 25a consists of a large diameter circular portion and wedged aperture continuous therewith. Aperture 25e is a standard aperture. Restraining lever 24 restrains aperture setting member 23 and releases its restraint in response to the closing of rear cover 20. Read-out circuit C processes the signals from any of contacts S1 to S6 and generates a digital signal commensurate with the film sensitivity that was read by the contacts. Digital/analog converter D/A converts the digital signal from circuit C into an analog signal, that determines the angle of deflection of needle MEa of ammeter ME. Thus, when aperture setting member 23 is released from the restraint by restraining lever 24 and moves towards the right, its stepped portion 23b scans the position of needle MEa such that the aperture setting member is stopped at a position dependent on the portion of the step that engages needle MEa.

Read-out circuit C generates a signal B when it detects that all the contacts S1 to S6 are in contact with non-conductive strips. Signal B forces the output of the D/A converter to switch the analog output A to a value that deflects needle MEa of ammeter ME largely to the outside of the locus of stepped portion 23b. Light receiving element PD for measuring object brightness is supported by holder 30 whose lateral position is adjustable by manual operation of parts not shown in the Figure.

Next, explanation will be given on the operation of each part. FIG. 3 shows the condition just before the closure of the camera rear cover. At this time, the signal of the film sensitivity has been read to deflect ammeter needle MEa to a position corresponding to the read sensitivity, if any of the strips 1 to 6 on cartridge F is conductive. When camera rear cover 20 is completely closed, restraining lever 24 is pushed by projecting portion 20a of the rear cover to turn clockwise about pin 24c against the force of spring 28. Then aperture setting member 23 which has been restrained by hook portion 24a of restraining lever 24, is released to slide rightwards under the force of spring 29 until it is stopped with stepped portion 23b of aperture setting member 23 coming into contact with needle MEa of ammeter ME. Thus, aperture plate 25, which is integral with aperture setting member 23, is at a position dependent on the amount of the deflection of ammeter needle MEa such that any one of apertures 25a, 25b, 25c and 25d is brought into registration or alignment with light receiving element PD. Holder 30 is manually displaceable in the lateral direction shown by the arrow to bring light receiving element PD into alignment with any of apertures 25a, 25b, 25c and 25d thereby enabling manual compensation of the exposure.

When rear cover 20 is opened after the entire film has been exposed, charging means 22 turns therewith to the position 22' shown by a phantom line and then move aperture setting member 23 against the force of spring 29 until hook portion 24a of restraining lever 24 engages detent portion 23a and locks aperture setting member 23.

On the other hand, when none of the strips at the code areas of film cartridge is conductive, needle MEa of the ammeter ME deflects to the outside of the locus of the stepped portion 23b of the aperture setting member. Therefore, when aperture setting member 23 is released from the restraint through its detent portion 23b, aperture setting member 23 moves to the right (as viewed in FIG. 3) until the left end of guide slot 23c in aperture setting member 23 comes into contact with the left-hand pin of two guide pins 27 where aperture plate 25 is positioned such that its standard aperture 25e aligns with light receiving element PD. In this case, if the size of standard aperture 25e is determined to correspond to the most popularly used film sensitivity, e.g. ASA or ISO 100, the film sensitivity is set to a value that will provide appropriate exposure for most cases when the camera is loaded with a film cartridge having no film sensitivity code. Additionally, the film sensitivity setting can be adjusted manually by manually moving holder 30 to the right or left.

In the above embodiment, holder 30 is manually operated for two purposes. One purpose is for the exposure compensation wherein the film sensitivity setting is changed from the condition where light receiving element PD is aligned with one of the apertures in accordance with the film sensitivity read from the cartridge. This is the case when it is desired that the amount of an exposure is somewhat changed from a design standard value that will be automatically determined as a function of a measured object brightness and set exposure conditions. The other purpose is for adjusting the film sensitivity setting to a proper value from the value given by standard aperture 25e by displacing light receiving element PD to align it with a proper aperture other than the standard aperture. This is the case when the camera is loaded with a film cartridge that has no film sensitivity code and contains a film of the sensitivity other than that corresponding to the standard aperture. FIG. 4 shows an embodiment of an indication system that indicates a set film sensitivity, distingushing the above two cases.

Indication plate 40 shown in FIGS. 5(a), 5(b) and 5(c) is interlocked with aperture setting member 23 through a mechanism (not shown) such that indication plate 40 moves to the left when setting member 23 moves to the right as viewed in FIG. 3. Indication plate 40 is provided thereon with numerals 41 representing film sensitivity values corresponding to the apertures to be selected automatically or manually. Indication plate 40 is further provided with indicias 49 corresponding to numerals 41 and numeral 42 representing the film sensitivity corresponding to standard aperture 25b. Indication plate 40 is transparent except the portion of mask 43 for covering.

FIG. 5(b) shows the condition for the indication when the aperture for the light measurement is automatically set. Fixed plate 44 is formed with recess 47 through which in the case of the automatic setting, one of the indicia registered with the appearing indicia represents an automatically set film sensitivity. In the embodiment shown, it is indicated that an aperture corresponding to ASA 100 has been set. Index plate 45 is interlocked with holder 30 through a mechanism not shown such that index plate 45 moves to the left when holder 30 moves to the right as viewed in FIG. 4. Index 48 is provided on index plate 45. Holder 30 (see FIG. 3) and index plate 45 are reset to their predetermined position by the opening and closing of rear cover 20 (see also FIG. 3) through a mechanism not shown. Therefore, index 48 on index plate 45 is normally in registration with recess 47 of fixed plate 44. Fixed indication plate 46 is provided thereon with numerals "2", "1", "0", "−1" and "−2", which represent by the unit of the exposure step the amount of exposure compensation. Accordingly, when holder 30 shown in FIG. 4 is moved to the right from the predetermined position, i.e. when light receiving element PD is displaced from the normal position to be in alignment with an automatically selected aperture to a position to be in alignment with a smaller aperture for providing an over-exposure, index plate 45 moves to the left to be in alignment with a numeral of a positive value, e.g. +1 to indicate overexposure by one step.

FIG. 5(c) shows the condition of the indication system when no film sensitivity signal has been detected.

In this case, aperture setting member 23 has traveled to its right end as viewed in FIG. 3, to select standard aperture 25b with indication plate 40 having moved to its left end so that recess 47 registers with an aperture representing a film sensitivity (e.g. 100 for ASA 100 in the embodiment) corresponding to standard aperture 25b. At this time, when holder 30 is set at the predetermined position, index 48 on index plate 45 is in registration with the numeral 100 for ASA 100.

At the same time, mask 43 covers the numerals for the indication of compensated exposure steps since indication plate 40 has moved to its left end.

With this condition, if the film loaded has a sensitivity other than ASA 100, then the camera operator should displace holder 30 to the left until light receiving element PD comes into alignment with an aperture corresponding to the sensitivity of the loaded film, whereby index plate 45 is moved to the left, and its index 48 is brought into registration with the numeral for the film sensitivity corresponding to the selected aperture.

FIG. 5(c) shows the condition where ASA 200 has been manually selected.

Figure 6:
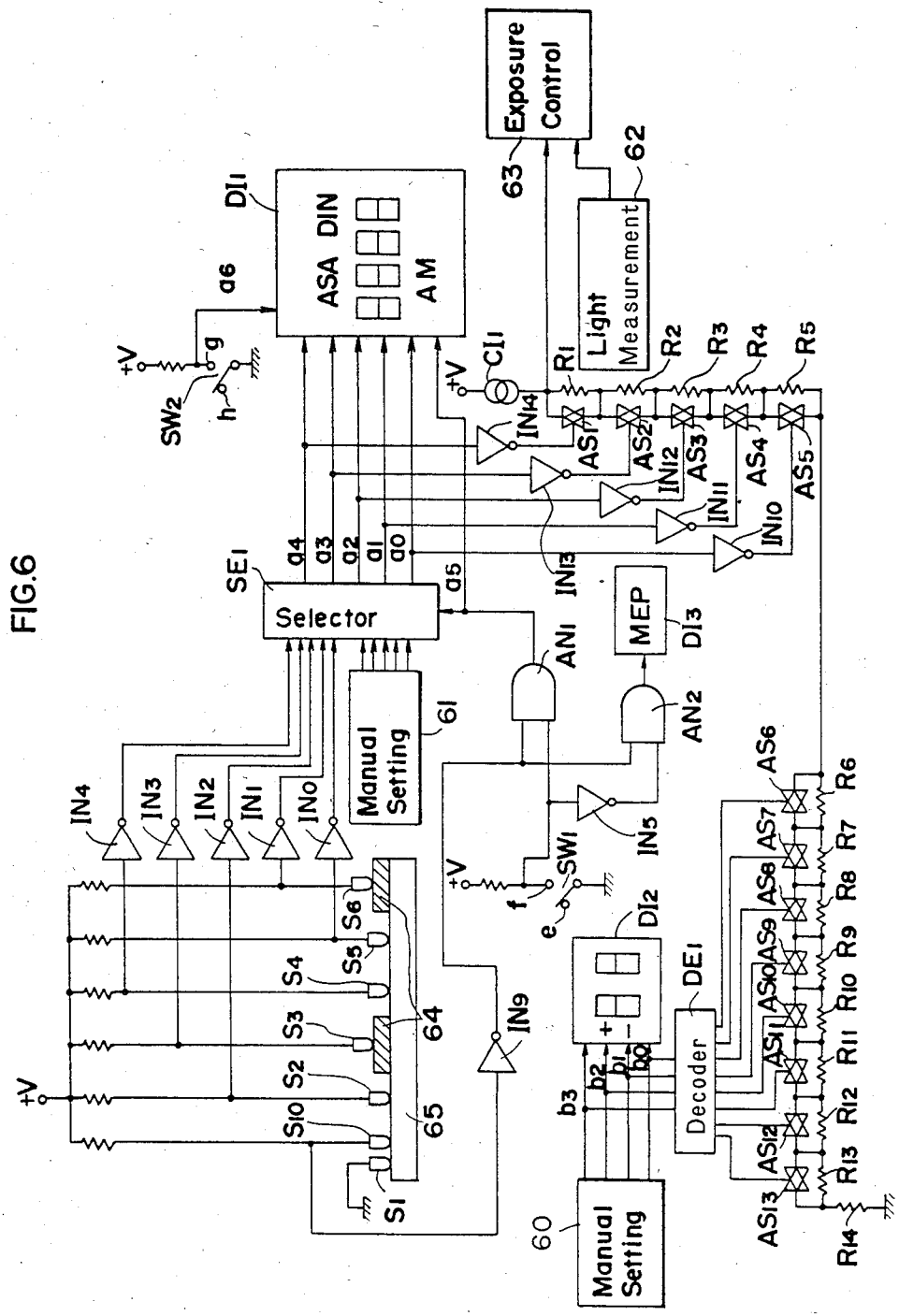
FIG. 6 is a diagram of a camera circuit according to the present invention which is adapted to read out the codes of FIG. 2.

FIG. 6 shows a camera circuit adapted for use with the film cartridges having film data in the form of encoded patterns as shown in FIG. 2 and Table 1. Conductive plate 65 lies in encoded portions 1 to 6 on film cartridge of FIG. 1. Electrically insulating layer 64 is made of, for example, painting material and is formed on non-conductive portions of the encoded portion. In the case of FIG. 1 structure, the electrically insulating layer is removed at encoded portions 1 and 4 to expose conductive plate 65. In the case of the FIG. 6 structure, the electrically insulating layer is removed at encoded portions 1, 2, 4 and 5. Accordingly, the code in FIG. 1 corresponds to ASA 100 and SV 7, and code in FIG. 6 corresponds to ASA 1000 and SV $8\frac{1}{3}$.

Taking the code pattern of FIG. 6, for example, terminals S1 to S6 are provided to respectively engage encoded portions 1 to 6 and terminal S10 is engageable with encoded portion 1. In the FIGURE, terminals S2, S4 and S5 are grounded through conductive plate 65 and terminal S1 whereby a digital signal of "10101" is generated from inverters IN4 and IN0. Switch S10 detects whether the film cartridge is provided with the data of the sensitivity of the film contained therein. If the film cartridge is provided with the film sensitivity data, the encoded portion 1 is always conductive with the conductive layer being exposed as is seen in FIG. 2, whereby the output of inverter IN9 is always "High" and the "High" signal is output as a signal representing the existence of film sensitivity data. If the film cartridge is not provided with any film sensitivity data, the portion of the cartridge corresponding to encoded portion 1 is covered by the electrically insulating layer and terminal 10 is not grounded, whereby the output of inverter IN9 is low to show that the film cartridge loaded has no film sensitivity data. Thus, switch S10 enables the distinction between the film cartridge bearing the data of ASA 25 in the form shown in FIG. 16 and the film cartridge bearing no film sensitivity datum.

When the output of inverter IN9 is high and switch SW1 is connected to terminal e, the output of AND circuit AN1 will be high so that the digital signal generated from inverters IN4 to IN0 in correspondence with the film sensitivity will be generated through terminals a4 to a0 of selector SE1. In the case of the data of FIG. 6, the digital value of the signal is "10101". At this time, if switch SW2 is connected with terminal h, indicating section DI1 indicates the film sensitivity as ASA 1000 since terminal a6 is "High" and if switch SW2 is connected with terminal g, indicating section DI1, indicates the film sensitivity as DIN31 since terminal a6 is low. To this end, indication device DI1 is arranged to make its ASA indication decoder effective in response to a "High" level at terminal a6 and make its DIN indication decoder effective in response to a "Low" level at terminal a6. Switch SW2 may be arranged to be switched manually from the exterior of the camera, or else may be set, during the camera assembly, to either connection in accordance with the country where the camera is to be used. Additionally, when the "High" level signal at the output terminal a5 of AND circuit AN1 is applied to the input terminal of indication device DI1, a mark A is displayed for indicating that film sensitivity has been automatically set.

When the camera is loaded with a film cartridge having no film sensitivity data, the output of inverter IN9 will become "Low" to make the output terminal a5 of AND circuit AN1 "Low". As a result, a digital signal from manual film sensitivity setting device 61 is generated through terminals a4 to a0 of the data selector. Then, indication device, DI1, indicates the film sensitivity commensurate with the signal in ASA units or DIN units in accordance with the condition of switch SW2. At this time, indication device DI1, displays mark M for the indication of manual film sensitivity setting in response to the "Low" level at terminal a5.

When the output of inverter IN9 is "High" with the movable contact of switch SW1 being connected with terminal f, the output terminal a5 of AND circuit AN1 is "Low", so that data selector SE1 generates from its output terminals the data from manual setting device 61 irrespective of the fact that the camera has been loaded with a film cartridge with film sensitivity data.

Accordingly, terminal SW1 has a function of overriding or making ineffective the automatic film sensitivity setting when it is connected with terminal f. This function is effective when an exposure is desired to be made with an intentional film sensitivity setting to a value higher than an automatically set one. In this case, as the outputs of inverters IN9 and IN5 are both made "High", the output of AND circuit AN2 become "High" whereby indication device DI3 displays the character "MEP" for the indication of the film-sensitivity-intensified exposure. As a modification of the indication, it may be indicated how much change of the film sensitivity has been made for the exposure, by arranging indication device DI3 to display the difference between the output data through inverters IN4 to IN0 and the data from manual setting device 61 when the output of AND circuit AN2 is "High". If it is difficult to make terminals S1 and S10 in contact with encoded portion 1 of the cartridge shown in FIG. 1 because of the restriction of space, the width of encoded portion 1 in the direction of the axis of the cartridge may be doubled in comparison with the width of other encoded portions.

The resistance values of resistors R1 to R5 in FIG. 6 are selected such that the resistance of resistor R1 corresponds to SV=4, the resistance of resistor R2 to SV=2, the resistance of resistor R3 to SV=1, the resistance of resistor R4 to SV=$\frac{2}{3}$ and the resistance of resistor R5 to SV=$\frac{1}{3}$. Accordingly, when a digital signal of "10101" (corresponding to ASA 1000, SV=$8\frac{1}{3}$) is generated from terminals a4 to a0 of data selector Se1, inverter IN14 to IN10 turns analog switches AS2 and AS4 "on" and switches AS1, AS3 and AS5 "off" to supply resistors R1, R3 and R5 with current from constant current source CI1 and also supply resistors R6 to R9 and R14 with a current whereby exposure control circuit 63 is fed with an analog signal corresponding to SV=$5\frac{1}{3}$+3-=$8\frac{1}{3}$. Exposure control circuit 63 is also fed with a signal from light measuring circuit 62 and makes an exposure calculation and exposure control with the fed signals. In the above process, when the output at terminal a4 corresponding to a digital logic value "1", resistor R1 with the weight of four is made effective, and in the same manner when the output at terminal a3 is logic "1", resistor R2 with the weight of two is made effective, when the output at terminal a2 is logic "1", resistor R3 with the weight of one is made effective, when the output at terminal a1 is logic "1", resistor R4 with the weight of two thirds is made effective, and when the output at terminal a0 is logic "1", resistor R5 with the weight of one third is made effective.

Circuit 60 is for manual setting of the exposure compensation. Indication device DI2 displays one of "+2.0", "+1.5", "+1.0", "+0.5", "0", "−0.5", "−1.0", "−1.5" and "−2.0" in accordance with the data signal from output terminals b3 to b0. Decoder DE1 generates output signals for turning analog switches AS6 to AS13 "on" or "off" in response to the data signal from terminals b3 to b0.

Table 2 shows the interrelationship between the input signals to decoder DE1 and the "on" or "off" state of analog switches AS9 to AS3.

TABLE 2

| Amount of Compensation | b3 | b2 | b1 | b0 | AS6 | AS7 | AS8 | AS9 | AS10 | AS11 | AS12 | AS13 |
|---|---|---|---|---|---|---|---|---|---|---|---|---|
| +2.0 | 1 | 0 | 0 | 1 | ON | ON | ON | ON | ON | ON | ON | ON |
| +1.5 | 1 | 0 | 0 | 0 | OFF | ON | ON | ON | ON | ON | ON | ON |
| +1.0 | 0 | 1 | 1 | 1 | OFF | OFF | ON | ON | ON | ON | ON | ON |
| +0.5 | 0 | 1 | 1 | 0 | OFF | OFF | OFF | ON | ON | ON | ON | ON |
| 0 | 0 | 1 | 0 | 1 | OFF | OFF | OFF | OFF | ON | ON | ON | ON |
| −0.5 | 0 | 1 | 0 | 0 | OFF | OFF | OFF | OFF | OFF | ON | ON | ON |
| −1.0 | 0 | 0 | 1 | 1 | OFF | OFF | OFF | OFF | OFF | OFF | ON | ON |
| −1.5 | 0 | 0 | 1 | 0 | OFF | OFF | OFF | OFF | OFF | OFF | OFF | ON |
| −2.0 | 0 | 0 | 0 | 1 | OFF | OFF | OFF | OFF | OFF | OFF | OFF | OFF |

The resistance values of resistors R6 to R13 respectively correspond to $SV = \frac{1}{2}$ and the resistance value of resistor R14 corresponds to $SV = 1$. Accordingly, if the value of the exposure compensation is +2.0, all the analog switches AS6 to AS13 are turned "on" to supply the current from constant current source CI1 only to resistor R14 whereby a signal corresponding to $SV = 1$ is generated at the node between resistors R5 and R6 thereby enabling photography with the exposure being compensated by +2.0 EV. When the exposure compensation is not effected, i.e. when the amount of the exposure compensation is "0", analog switches AS10 to AS13 are turned "on" to supply current to R9 and R14 thereby generating a signal corresponding to $SV = 3$ at the node between resistors R5 and R6, resulting in photography with a normal or standard exposure. It will be apparent to those skilled in the art that the photographs with exposure compensations of other values may be made in accordance with the relationships shown in Table 2. Thus, description thereof is omitted here.

Figure 7:
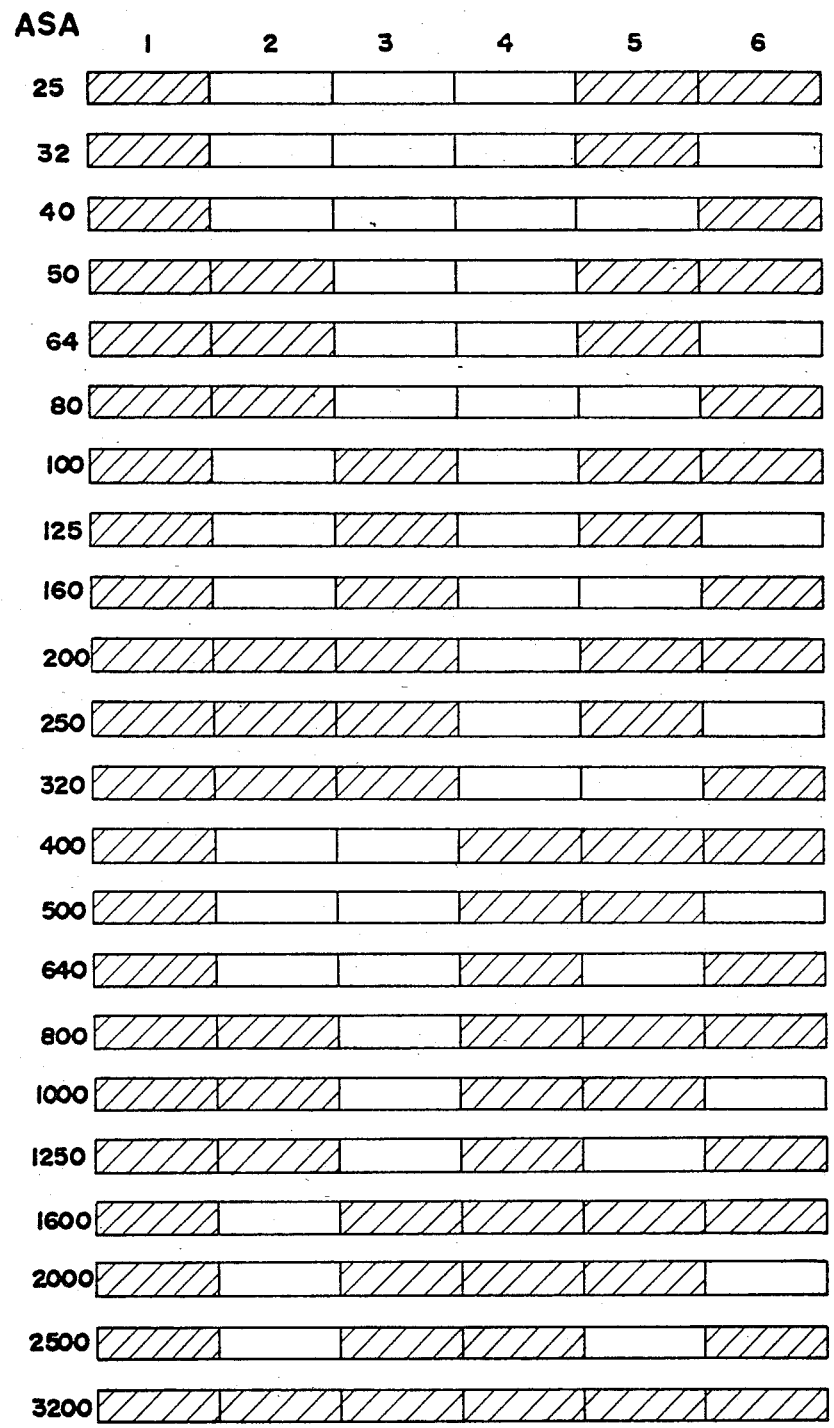
FIG. 7 shows an improvement of codes according to the present invention.
Figure 8:
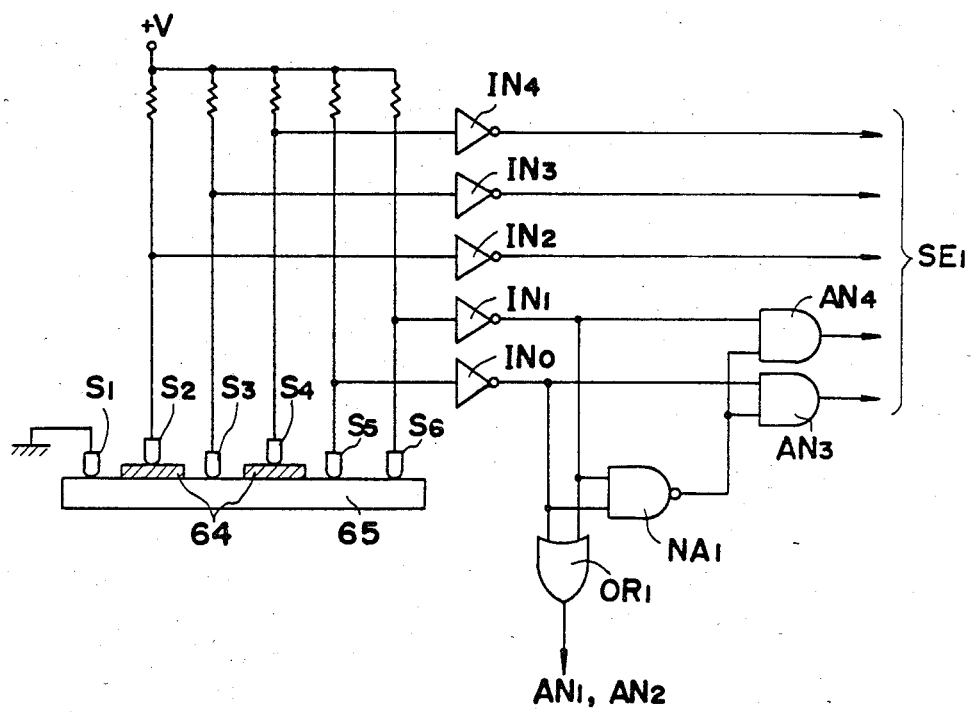
FIG. 8 is a diagram of another camera circuit according to the present invention which is adapted to read the codes of FIG. 7.

When the conventional encoding as shown in FIG. 2 is employed, all the encoded portions 2 to 6 must be insulated for ASA 25 so that two terminals S1 and S10 to be in contact with encoded portion 1 are required as shown in FIG. 6 for the distinction between the cartridge with a film sensitivity data and the cartridge without such data, resulting in inconvenience in term of the space for the two terminals. Accordingly, an improvement of the encoding of FIG. 2 is proposed in FIG. 7 wherein both encoded portions 5 and 6 in FIG. 2 are made conductive for ASA 25, 50, 100, 200, 400, 800, 1600 and 3200. FIG. 8 shows a circuit for reading out the data of a film sensitivity from the film cartridge with such coding.

With reference to FIG. 8, if the camera is loaded with a film cartridge having a film sensitivity data encoded in the manner described above, at least one of encoded portions 5 or 6 is conductive by the exposure of conductive plate 65 for any of the film sensitivity 25 to 3200 and at least one of inverters IN0 and IN1 generates a "High" level signal. Accordingly, OR circuit OR1 generates a high-level signal, which serves as the signal for indicating that the film cartridge loaded has a film sensitivity data. When both inverters IN1 and IN0 generate "High" level signals, the output of NAND circuit NA1 become "Low" and the both outputs of AND circuit AN3 and AN4 become "Low".

If either one of the outputs of inverter IN1 or IN0 is low, the output of NAND circuit NA1 is high and AND circuits AN4 and AN3 generate signals that are the same as those of inverter IN1 and IN0. Accordingly, data that is the same as those from inverter IN4 to IN0 of FIG. 6 can be obtained from inverters IN4 to IN0 and AND circuit AN4 and AN3 of FIG. 8. Thus, the improved encoding according to the above proposal in combination with the FIG. 8 circuit not only provides the same function as that of the FIG. 6 circuit and its associated encoding, but also eliminates the necessity of terminal S10 for the detection whether a film cartridge has a film sensitivity data or not.

Figure 9A:
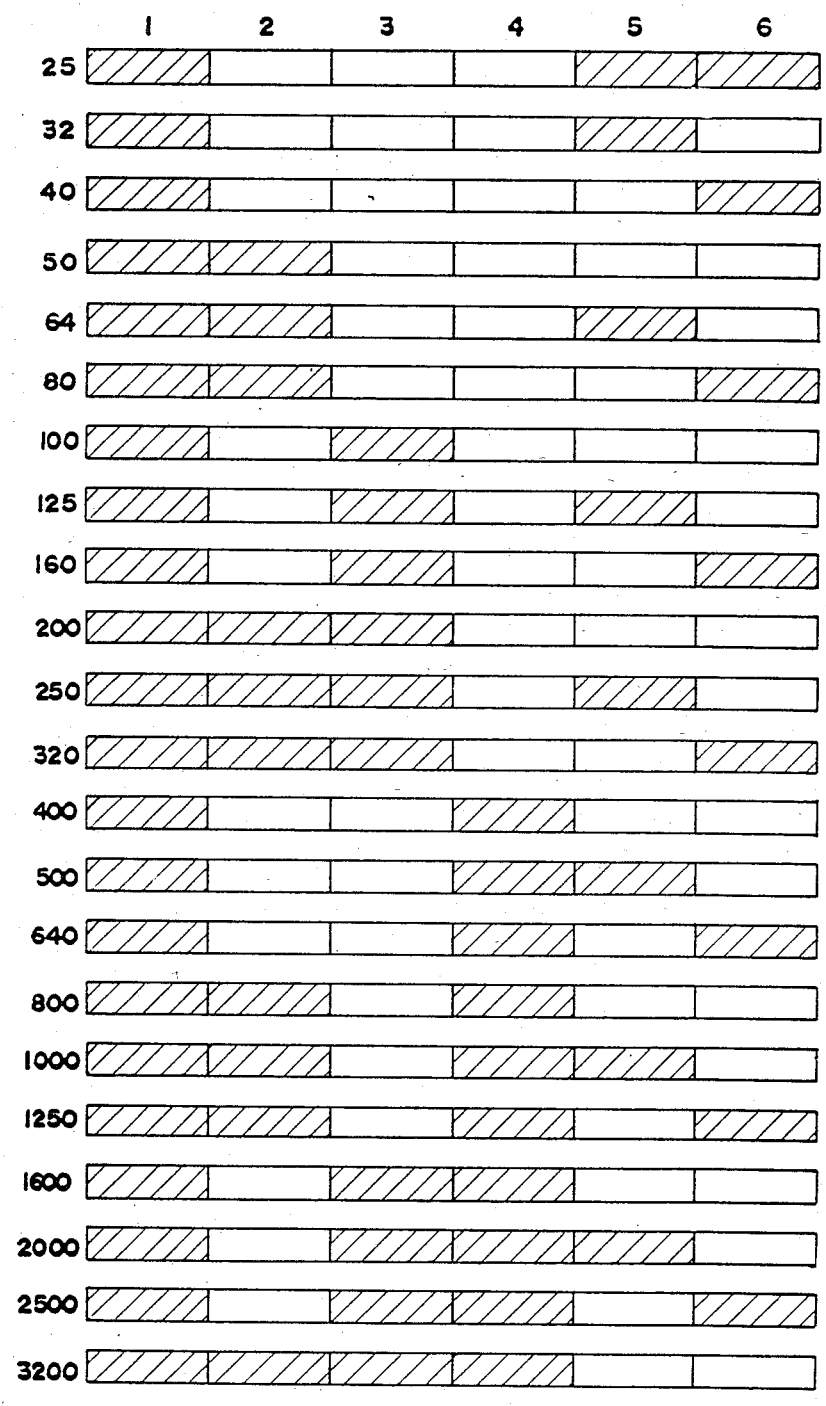
FIG. 9(a) shows another improvement of codes according to the present invention.
Figure 10:
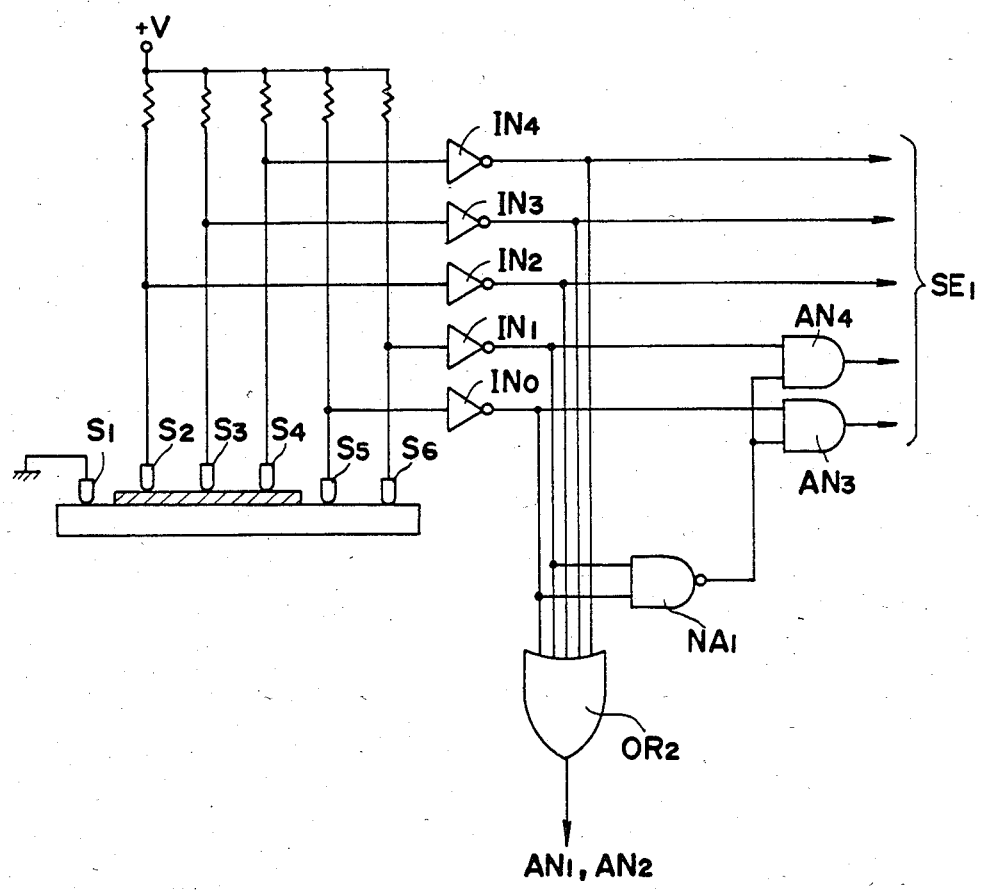
FIG. 10 is a diagram of a camera circuit adapted to read out the codes of FIG. 9(a)

In another improvement of encoding shown in FIG. 9(a), both encoded portions 5 and 6 are made conductive only for ASA 25, while the encoding for other sensitivities is the same as the conventional one shown in FIG. 2. FIG. 10 shows a circuit for reading out a film sensitivity data from a film cartridge with such coding.

If conductive plate 65 is exposed at encoded portions 5 and 6 in FIG. 10, output of NAND circuit NA1 is Low and the outputs of AND circuits AN3 and AN4 are both "Low". In contrast thereto, for all the film sensitivities other than ASA 25, both outputs of inverters IN1 and IN0 can not be "High", whereby the output of NAND circuit NA1 is always "High" and AND circuits AN4 and AN3 generate the same outputs as those of inverter IN1 and IN0 exactly in their states. Additionally, when the camera is loaded with a film cartridge with a film sensitivity data encoded in the manner described above, at least one of inverters IN4 to IN0 generates a "High" level signal to make the output of OR circuit OR2 "High", which is utilized to show the automatic setting of the film sensitivity.

Figure 9B:
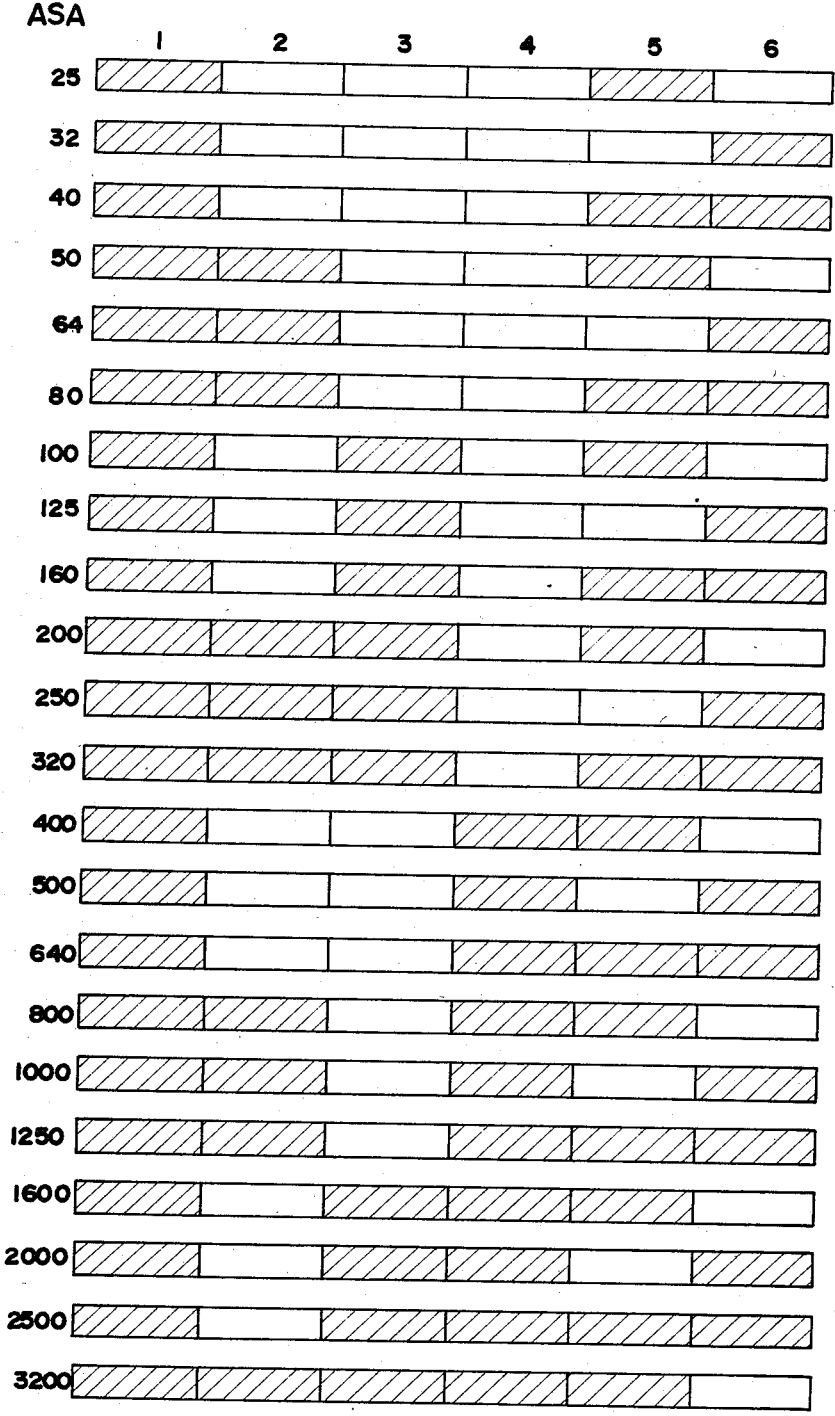
FIGS. 9(b) and 9(c), respectively, show an additional improvement of a code according to the present invention.
Figure 9C:
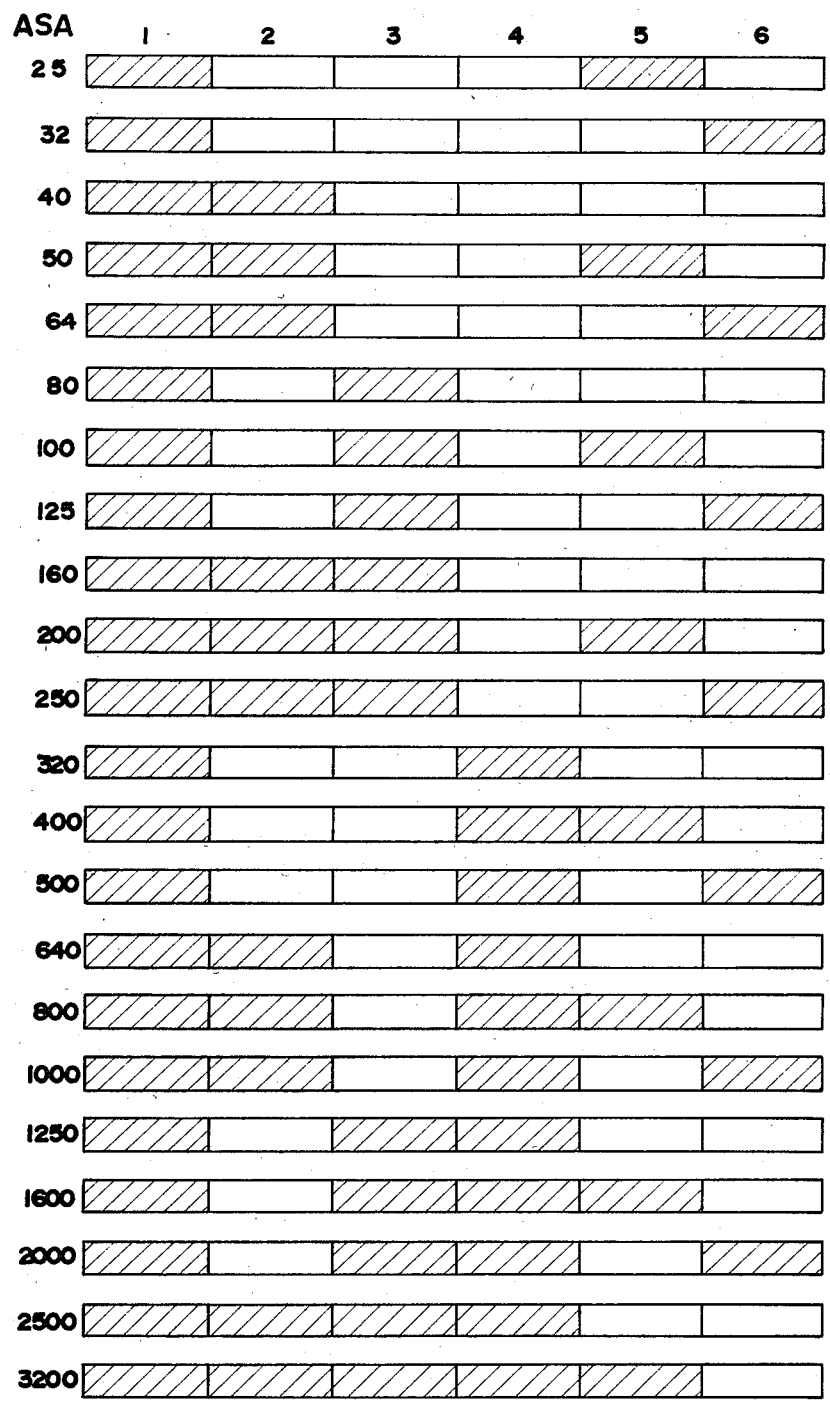

As still another improvement of encoding, the coding shown in FIG. 2 may be shifted by $\frac{1}{3}$ step as shown in FIGS. 9(b) and 9(c) are necessary from terminals S2 to S6. With this coding, only terminals S1 to S6 are generated digital signals of, for example, "00001" for ASA 25, "00010" for ASA 32, "10001" for ASA 400 and "11101" for ASA 3200 wherein the digital values are arranged in the order from the bits with bigger weight to the bits with lighter weight as in the same manner as Table 1 and the first bit of the digital signals corresponds to terminal S4, the second bit to terminal S3, the third bit to terminal S2, the fourth bit to terminal S6 and the fifth bit to terminal S5. This can be done by making the resistance value of resistor R14 correspond to $SV = \frac{2}{3}$.

As another arrangement, the conductive and non-conductive states at encoded portions 2 to 6 may be inverted by substituting the conductive portions by non-conductive portions and vice versa, with terminals S2 to S6 directly connected to selector SE1 without interposition of inverters IN4 to IN06. With this arrangement, whether a film sensitivity has been automatically set or not, can be detected by the OR output of five-bit signals from encoded portions 2 to 6.

Indication devices DI1, DI2 and DI3 should preferably employ respective circuits for dynamic display by liquid crystal. Additionally, those devices should preferably be disposed at the position where a manual film sensitivity setting device was disposed in conventional cameras. Manual setting devices 60 and 61 should desirably include setting means consisting of push buttons or slide switches.

Figure 11:
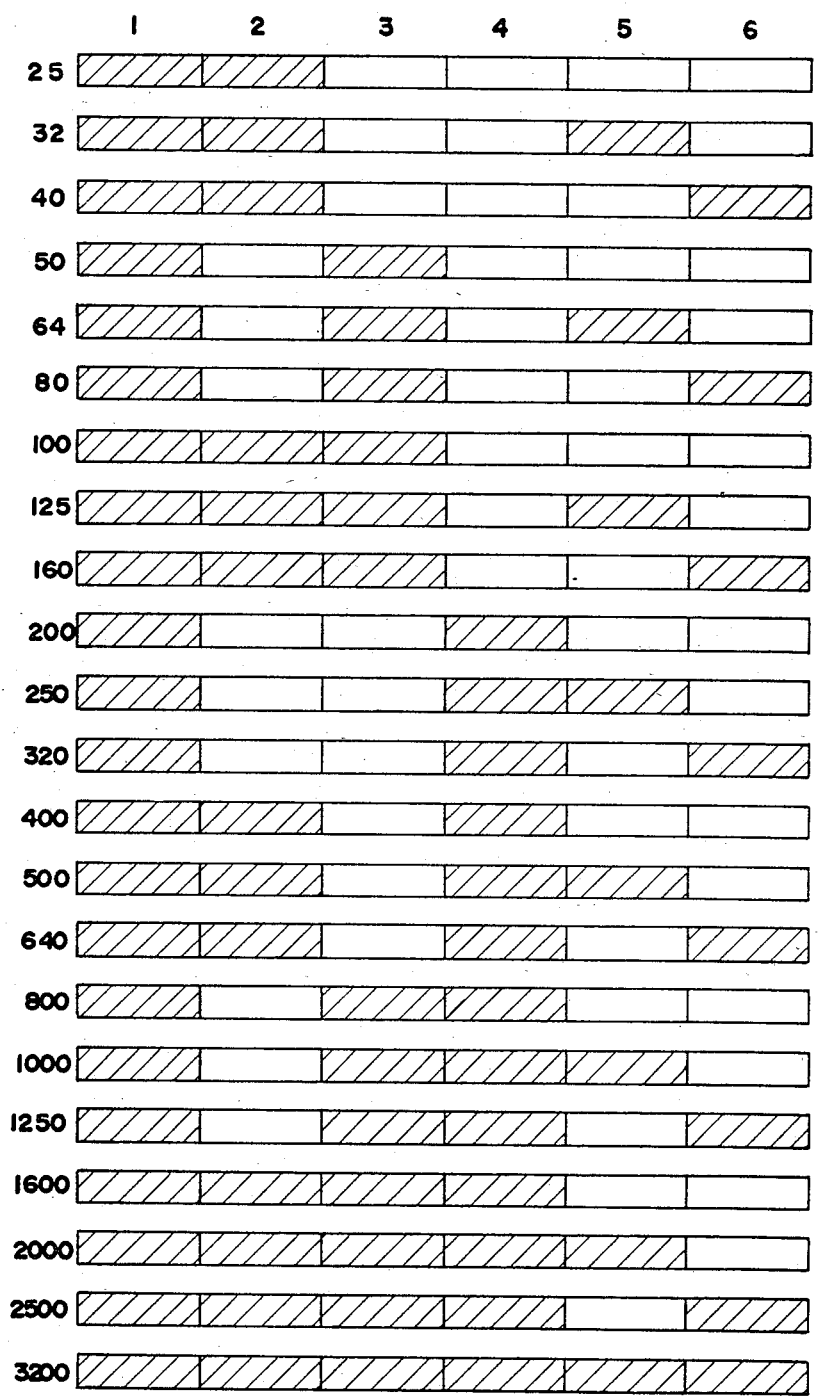
FIG. 11 shows yet another improvement of codes according to the present invention.
Figure 12:
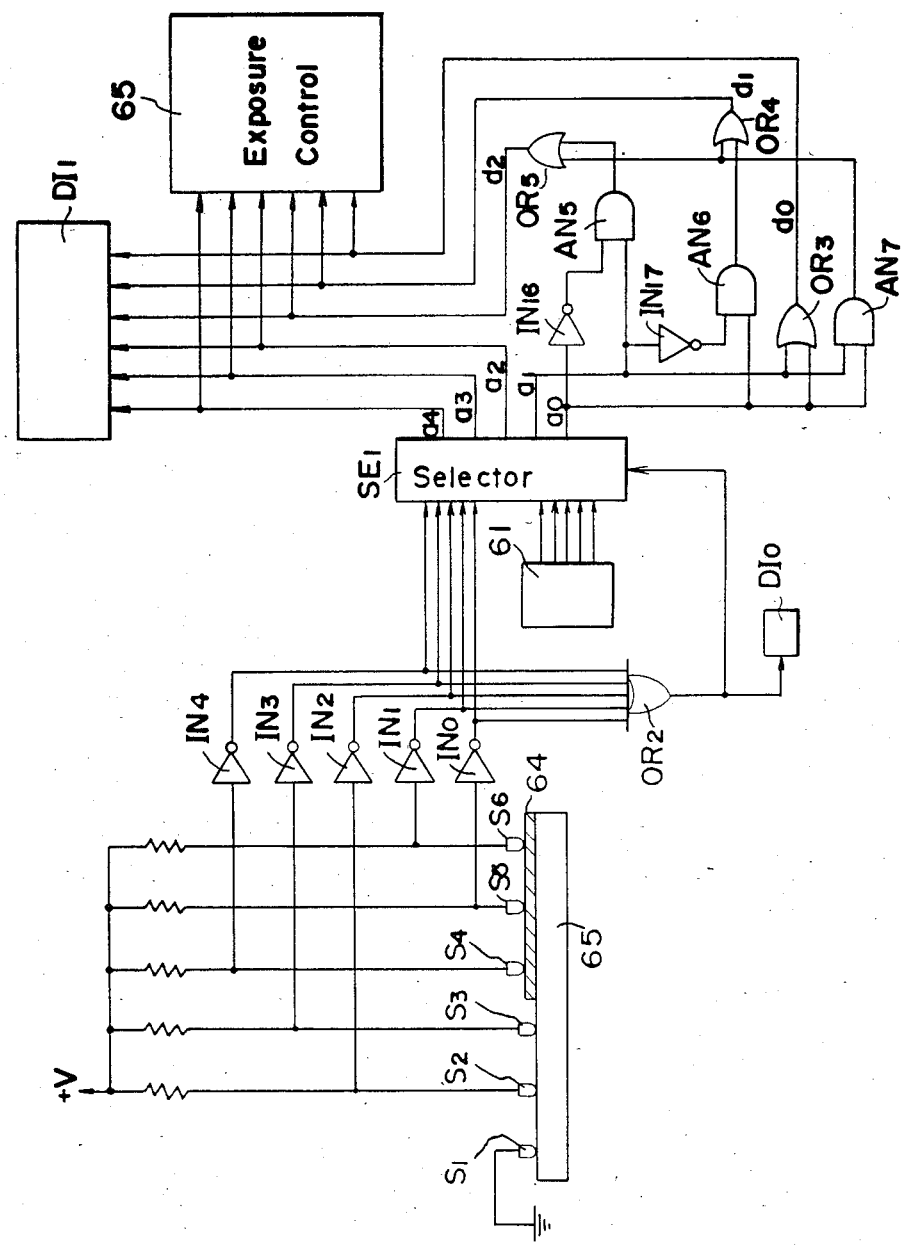
FIG. 12 is a diagram of a camera circuit according to the present invention which is adapted to read the codes of FIG. 11.

A further improvement of the coding is shown in FIG. 11 in which the coding shown in FIG. 2 is shifted by 1 step. FIG. 12 shows a camera circuit adapted for use with film cartridges having film speed data in the form of encoded patterns shown in FIG. 11. In FIG. 12, the circuit elements which are the same as or similar to those in FIGS. 6, 8 and 10 are denoted by the same reference letters and numerals and exposure control circuit 65 is designed as a digital circuit. As it is usual for digital calculations to put weights of $\frac{1}{2}$, $\frac{1}{4}$ and $\frac{1}{8}$ on decimal or fractional bits, the circuit shown in FIG. 12 is provided with a circuit for converting the data with the weights of $\frac{1}{3}$ and $\frac{2}{3}$ to data with the weights of $\frac{1}{2}$, $\frac{1}{4}$ and $\frac{1}{8}$.

When a camera is loaded with a film cartridge having film data represented by one of the encoded patterns shown in FIG. 11, terminal S1, and at least one of terminals S2 through S6 conduct to render the output of OR circuit OR2 "High", whereby the digital signal from inverters IN0 through IN4 is generated from terminals a4 to a0 of data selector SE1 while indication device DI0 indicates that the film speed is automatically set. The weights of $\frac{1}{3}$ and $\frac{2}{3}$ appear on terminals a0 and a1 of data selector SE1 respectively and the weights of $\frac{1}{2}$, $\frac{1}{4}$ and $\frac{1}{8}$ appear on terminals d0 of OR circuit OR3, terminal d1 of OR circuit OR4 and terminal d2 of OR circuit OR5 respectively. When the data with the weight of $\frac{1}{3}$ is read out, i.e., when the output of terminal a0 becomes "High" with the output of terminal a1 being "Low", OR circuits OR3 and OR4 and AND circuit AN6 generate a "High" output respectively since the output of inverter IN17 becomes high. Thus, an approximation of $$\tfrac{1}{3} \approx \tfrac{1}{4} + \tfrac{1}{8}$$

is effected to make terminals d1 and d0 "High". When the data with the weight of $\frac{2}{3}$ is read out, i.e., when the output of terminal a1 becomes "High" with the output of terminal a0 being "Low", inverter IN16 generates a "High" output, so that AND circuit AN5 and OR circuits OR3 and OR5 generate a "High" output respectively. Thus an approximation of $$\tfrac{2}{3} \approx \tfrac{1}{2} + \tfrac{1}{8}$$

is effected to make terminals d2 and d0 "High".

On the other hand, in the case of the film speeds whose Sv values have no decimal values, both of the outputs of terminals a0 and a1 become "low" to make all terminals d0, d1 and d2 "Low". Except, however, in the case of ASA 3200 both of the outputs of terminals a0 and a1 become "High" so that OR circuits OR3 through OR5 and AND circuit AN7 generate a "High" output respectively. Thus in this case an approximation of $$1 \approx \tfrac{1}{2} + \tfrac{1}{4} + \tfrac{1}{8} = \tfrac{7}{8}$$

is effected to make all terminals d0, d1 and d2 "High".

Exposure control circuit 65 and indication device DI1 receive the outputs of terminals a4, a3 and a2 of data selector SE1 and those of terminals d2, d1 and d0 of OR circuits OR5, OR4 and OR3, for making digital calculations.

Meanwhile, with the coding shown in FIG. 11 and the circuit shown in FIG. 12, exposure control circuit 65 receives digital signals with values of 1 and 2 when Sv values are 3 and 4, respectively. The occurrence of such a difference is of no significance but, if the values should coincide, an appropriate addition circuit may be provided which adds a signal of value 2 to the signals to be received by exposure control circuit 65. Alternatively, exposure control circuit 65 may include an appropriate addition circuit section which adds a signal of value 2 to the signals received thereby.

Figure 13:
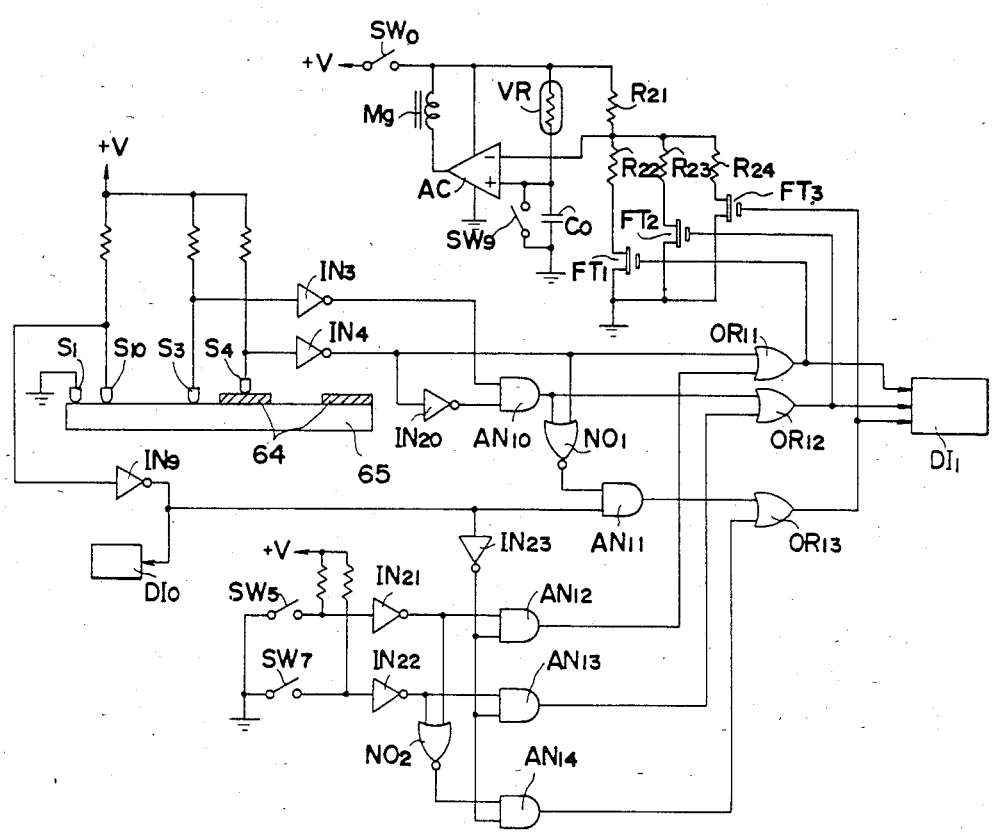
FIG. 13 is a diagram of another camera circuit according to the present invention which is adapted to read the codes of FIG. 2.

Another camera circuit adapted for use with film cartridges having film data in the form of the encoded patterns shown in FIG. 2 is shown in FIG. 13. This circuit sets three kinds of film speed ranges, i.e., a low film speed range for ASA 25–80, a middle film speed range for ASA 100–320 and a high film speed range for ASA 400–3200. As is apparent from FIG. 2, areas 3 and 4 are non-conductive with cartridges having a film of the low film speed range, area 3 is conductive but area 4 is non-conductive with cartridges having a film of the middle film speed range, and area 4 is conductive with cartridges having a film of the high film speed range.

In the FIG. 13 circuit, only terminals S1, S3 S4 and S10 are provided, and the output of inverter IN4 and thus the output of OR circuit OR11 become "High" for a film speed within the high film speed range. For a film speed within the middle film speed range, the outputs of inverters IN3 and IN4 become "High" and "Low" respectively. Inverter IN20 generates a "High" output with the output of inverter IN4 being "Low", causing AND circuit AN10 and OR circuit OR12 to generate a "High" output respectively. Moreover, for a film speed within the low film speed range, both of the outputs of inverters IN3 and IN4 become "Low" and thus NOR circuit NO1 generates a "High" output. In this case, AND circuit AN11 generates a "High" output causing the output of OR circuit OR13 to be "High" since terminals S1 and S10 conduct through conductive area 1 to enable AND circuit AN11.

When the camera is loaded with a film cartridge having no information of film sensitivity, all outputs of inverters IN3, IN4 and IN9 become "Low". In this case, inverter IN23 generates a "High" output, enabling AND circuits AN12, AN13 and AN14 so that signals of manually set film speeds can be generated from OR circuits OR11 through OR13. More particularly, when a film speed within the high film speed range is manually set, switches SW5 and SW7 are closed and opened respectively, causing inverter IN21, and circuit AN12 and accordingly OR circuit OR11 to generate a "High" output respectively. When a film speed within the middle film speed range is manually set, switches SW5 and SW7 are opened and closed respectively, causing inverter IN22, AND circuit AN13 and accordingly OR circuit OR12 to generate a "High" output respectively.

When a film speed within the low film speed range is manually set, both switches SW5 and SW7 are opened causing the outputs of inverters IN21 and IN22 to be "Low". In this case, the output of NOR circuit NO2 becomes "High" so that AND circuit AN14 and accordingly OR circuit OR13 generate a "High" output respectively. The outputs of OR circuits OR11 through OR13 are fed to indication device DI1 which then indicates the manually set film speed. Meanwhile, indication device DI0 indicates whether the film speed setting is automatically or manually effected. In this connection, it should be understood that a "High" output is always generated from inverter IN9 when the camera is loaded with a film cartridge having any one of encoded patterns shown in FIG. 2.

The outputs of the OR circuits OR11 through OR13 are also fed to the gate terminals of FETs (field effect transistor) FT1, FT2 and FT3 respectively. With a film speed within the high film speed range, detected or manually set, FET, FT1 is made conductive receiving the "High" output from OR circuit OR11 and a voltage determined by resistors R21 and R22 is applied to the negative input terminal of comparator AC. The resistance value of resistor R22 corresponds to ASA 400 for example. With a film speed within the middle film speed range detected or manually set, FET FT2 is made conductive receiving the "High" output from OR circuit OR12 and a current flow through resistors R21 and R23. The resistance value of resistor R23 corresponds to ASA 200 for example and the voltage determined by this resistor is applied to the negative input terminal of comparator AC. Similarly, a current flows through resistors R21 and R24 with FET FT3 made conductive when the detected or manually set film sensitivity is within the low film speed range. The resistance value of resistor R24 corresponds to ASA 50 for example and a voltage determined by this resistance is applied to the negative input terminal of comparator AC.

When switch SW0 is closed in association with depression of a camera release button (not shown), electric power is supplied to an exposure control circuit including photoconductive element VR such as CdS, capacitor C0, switch SW9, comparator AC and electromagnet Mg. Switch SW9 is opened upon initiation of shutter opening and closed upon completion of shutter closing. When the camera release button is depressed, switch SW0 is first closed, causing comparator AC to generate a "Low" output and thereby energizing electromagnet Mg which then arrests a shutter closing member (not shown). Thereafter, shutter opening starts and switch SW9 is opened so that capacitor C0 is charged by a current commensurate with the resistance value of photoconductive element (VR), i.e., the scene brightness. When the voltage across capacitor C0 reaches the voltage potential determined by one of resistors R22 through R24, the output of comparator AC is inverted from "Low" to "High" and electromagnet Mg is deenergized to allow shutter closing.

Figure 14:
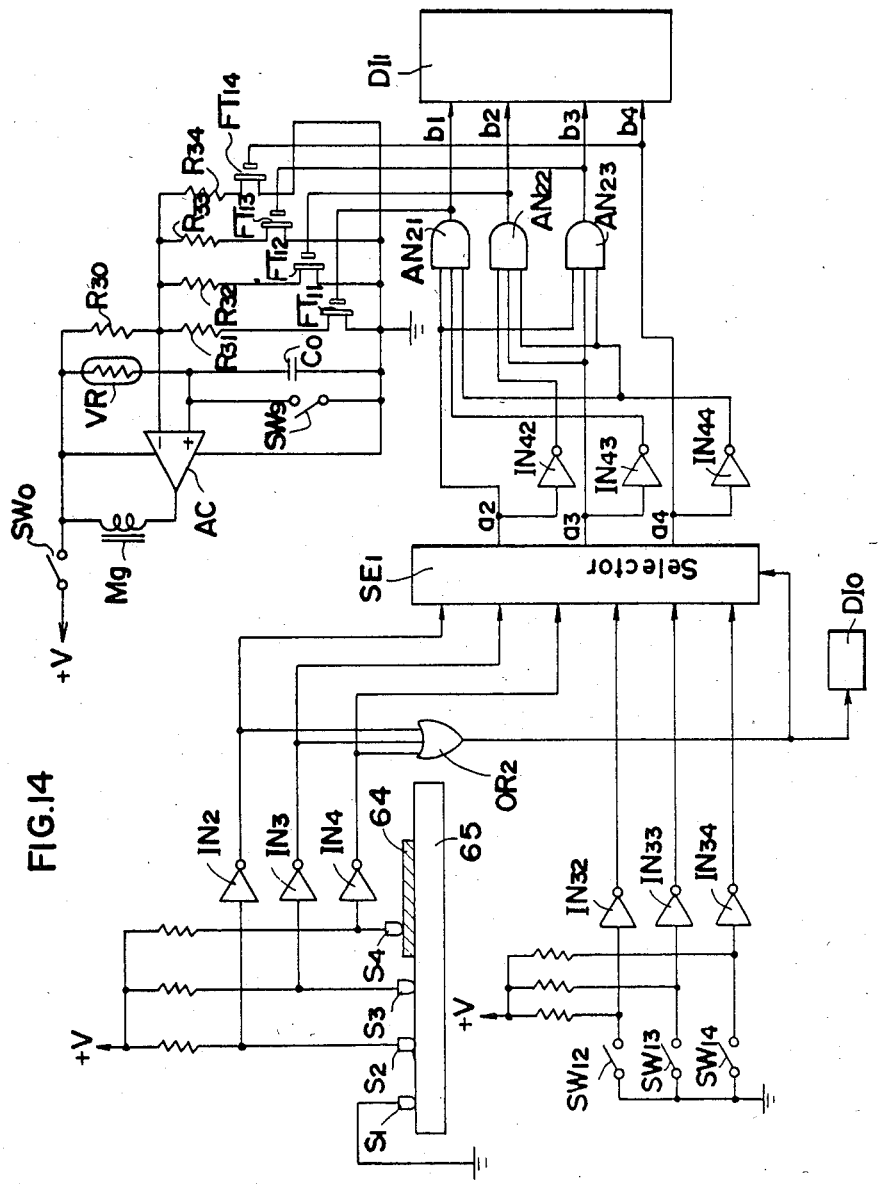
FIG. 14 is a diagram of another camera circuit according to the present invention which is adapted to read the codes of FIG. 11.

Another circuit adapted for use with a film cartridge having film speed data in the form of encoded patterns shown in FIG. 11 is shown in FIG. 14. This circuit sets four kinds of film speeds, i.e., ASA 32 for ASA 25 through ASA 40, ASA 64 for ASA 50 through ASA 80, ASA 125 for ASA 100 through ASA 160 and ASA 250 for ASA 200 through ASA 3200. With the coding shown in FIG. 11, at least one of areas 2 through 4 is conductive as is area 1. Hence OR circuit OR2 generates a "High" output and the signals from inverters IN2 through IN4 are generated from terminals a2, a3 and a4 of data selector SE1 respectively when the camera is loaded with a film cartridge having one of the encoded patterns shown in FIG. 11. In contrast thereto, if the camera is loaded with a film cartridge having no encoded pattern, the output of OR circuit OR2 becomes "Low" and signals from inverters IN32 through IN34, which correspond to manually set film speeds, are generated from terminals a2, a3 and a4 of data selector SE1. Switches SW12 through SW14 are closed and opened by a manual film speed setting member (not shown) and the closing and opening of these switches correspond to the coding of FIG. 11. More particularly, switch SW12 alone is closed for ASA 32, switch SW13 alone is closed for ASA 64, switches SW12 and SW13 are closed for ASA 125 and switch SW14 alone is closed for ASA 250.

With ASA 32 manually set, only the output of terminal a2 becomes "High" and AND circuit A21 generates a "High" output b1 making FET FT11 conductive so that resistor R31 corresponding to ASA 32 is made effective. Similarly, with ASA 64 manually set, only the output of terminal a3 becomes "High". This causes AND circuit AN22 to generate a "High" output b2, whereby FET FT12 conducts so that resistor R32 corresponding to ASA 64 is made effective. However, with ASA 125 manually set, the outputs of terminals a2 and a3 become high and AND circuit AN23 generates a "High" output b3 making FET FT13 conductive so that resistor R33 corresponding to ASA 125 is made effective. Moreover, with ASA 250 manually set, the output of terminal a4 becomes "High" rendering FET FT 14 conductive so that resistor R34 corresponding to ASA 250 is made effective.

Figure 15:
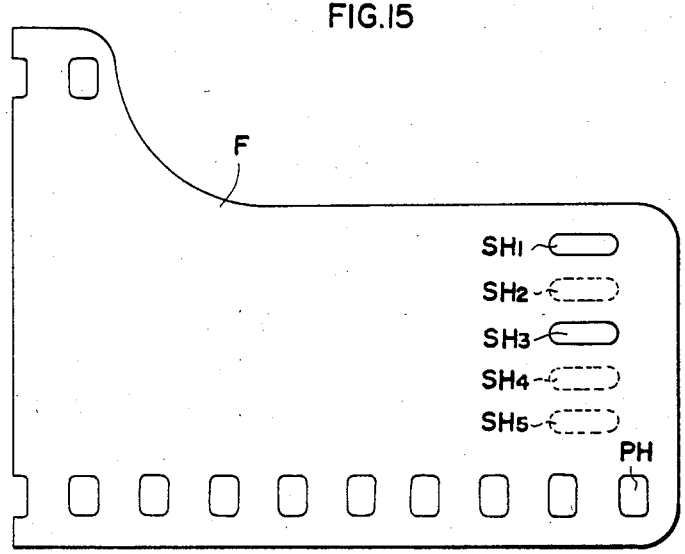
FIG. 15 is a plan view of a leading portion of a film according to the present invention.

FIG. 15 shows the appearance of the end of leader portion of a film according to the present invention for which the film is adapted for a camera designed to read (or detect) data on the film, such as a film sensitivity, by means of a film take-up spool. On both sides of film F are formed sprocket holes PH as is well-known in the art. Encoded portions SH1 to SH5 are perforated or unperforated to represent a film sensitivity by the digital code. The positions of encoded portions SH1 to SH6 along the length of the film is determined with reference to a predetermined sprocket hole. It is preferable that five encoded portions are formed between the first and second sprocket holes PH with the coded perforations being elliptical. In the embodiment shown, encoded portions SH1 and SH3 are perforated to represent a digitally coded value "10100" corresponding to a certain film sensitivity value.

Figure 16:
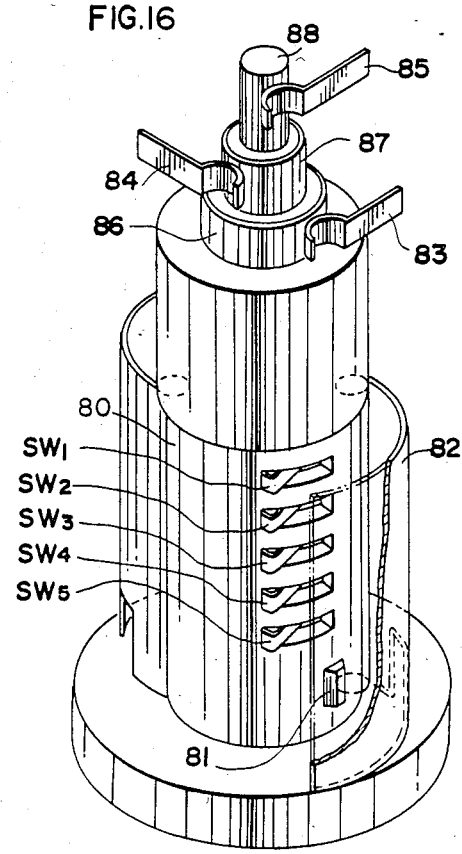
FIG. 16 is a perspective view of a spool of a camera according to the present invention for which the spool is arranged to read the signal holes on the film of FIG. 15.

FIG. 16 shows, in perspective view, an embodiment of a film take-up spool according to the present invention, which is adapted for use with the film shown in FIG. 15. At the lower portion of spool body 80 is formed pawl 81 that engages the first sprocket hole PH. Contacts S1 and S5 corresponding to encoded portions SH1 to SH5 are provided on spool body 80. A pair of flaps 82 are pivotable about their one end that is connected to the spool body, and are urged by springs to their open positions. Flaps 82 are made of electrically conductive material and are respectively grounded. Slider contacts or brushes 85, 84 and 83 are respectively in contact with power supply terminal 88, ground terminal 86 and output terminal 87 for outputting an analog signal commensurate with the data read from the film. Flaps 82 are respectively formed with a cut-out at the position to be engaged by pawl 81 when the flaps turn to their closing position. Thus, pawl 81 engages into the cut-outs to ensure the close contact between electrically conductive flaps 82 and any of the contacts SW1 to SW5 projecting through code perforations when the film is wound around spool body 80.

Figure 17:
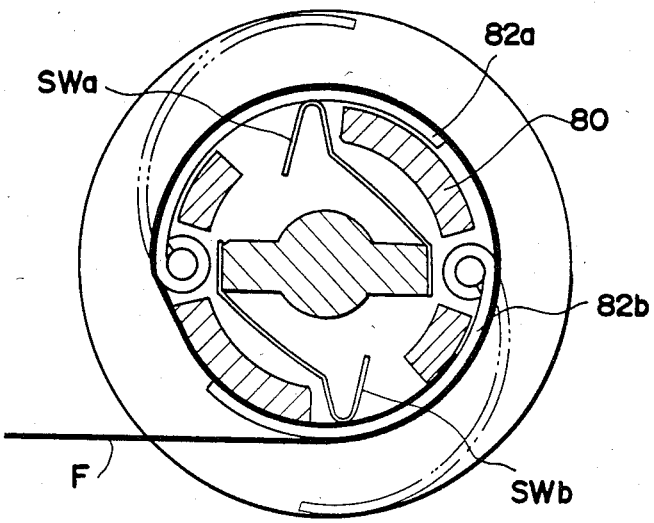
FIG. 17 shows a horizontal cross section of the spool of FIG. 16.

FIG. 17 is an enlarged cross sectional view of the spool of FIG. 16 for showing its film signal detecting portion. As shown in the Figure, flaps 82 are provided as a pair as shown by 82a and 82b and contacts SW1 to SW5 are also provided in two sets as shown by SWa and SWb. When film F is not wound around the spool, flaps 82a and 82b are open as shown by the phantom line. When spool 80 has been turned by one rotation i.e. 360° with the first sprocket hole PH of film F being engaged by pawl 81 of spool 80, flaps 82a and 82b are forced (or pressed) down by film F and closed as shown by a solid line. At this time, if any of encoded portions SH1 to SH5 of film F are perforated, the corresponding contacts of the set of contacts SWb project through the perforations into contact with flap 82b and close the contacts. If no perforation is formed at the encoded portions, electric connection will not be formed because film F is made of an insulating material. The conduction and non-conduction signals, i.e. on and off signals of respective contacts, are processed by the circuit shown in FIG. 6 and the output of the circuit is transmitted through out-put terminals 86 to 88 and slider contacts 83 to 85 to the circuit in the camera, which utilizes the output for exposure control, presetting of a film counter, and so on.

Figure 18:
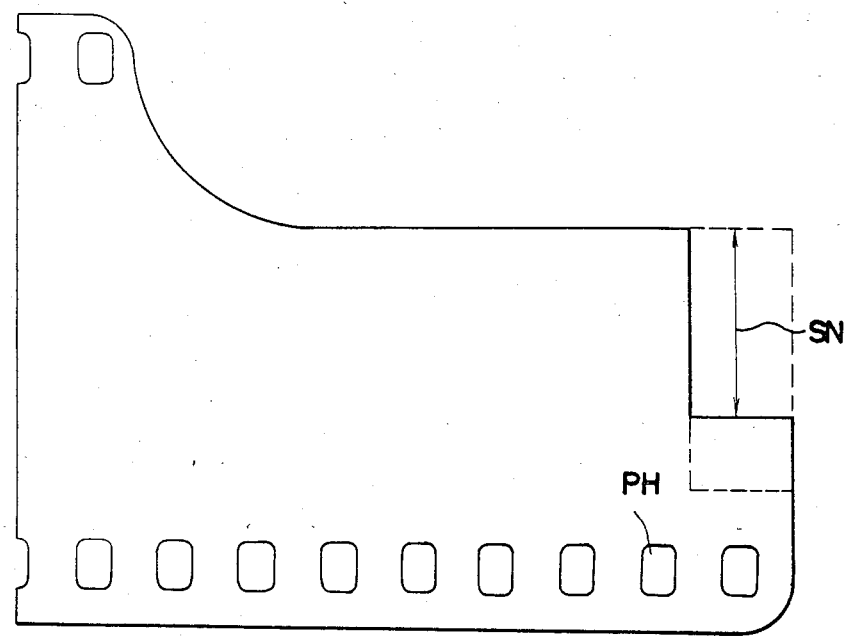
FIG. 18 is a plan view of a leading portion of another film according to the present invention.

FIG. 18 is a plane view showing the appearance of the end of the leading portion of another film adapted for a camera of the type in which the film take-up spool reads the information recorded on the film. The film is formed with sprocket holes PH along its upper and lower longitudinal edges. The film is formed with a cut-out SN representing a film sensitivity value. The cut-out SN has a depth from the upper edge, i.e. on the nonperforated side of the film leader portion, that is determined in dependence on the film sensitivity value, whereby the cut-out functions as a signal source.

Figure 19:
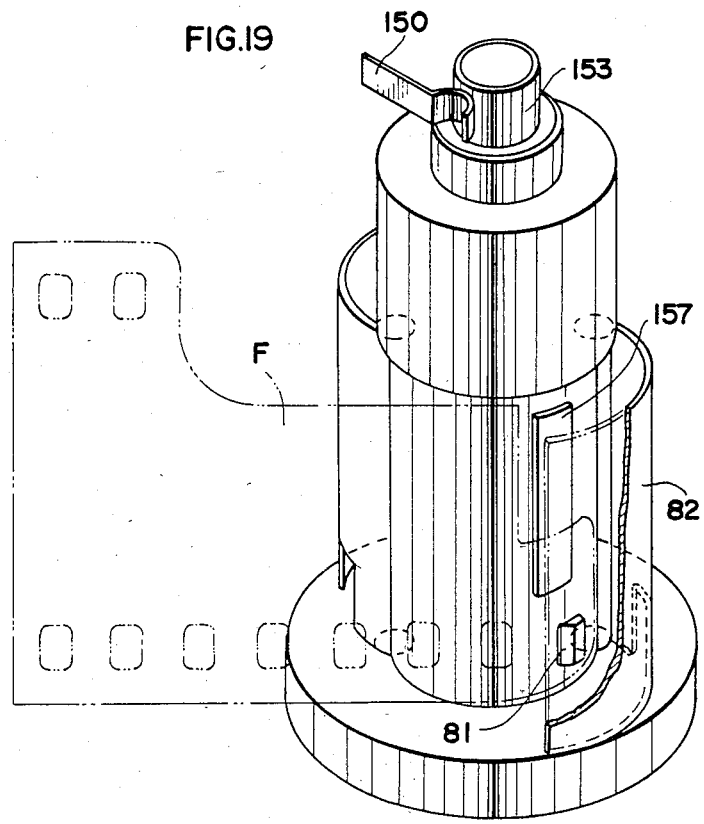
FIG. 19 is a perspective view of a spool of a camera according to the present invention for which the spool is arranged to read the depth SN of the cut-out on the film of FIG. 18.
Figure 20:
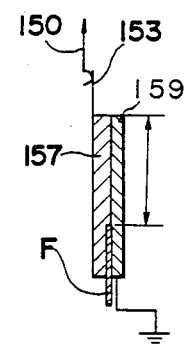
FIG. 20 is a schematic cross sectional illustration showing the manner how the depth SN is detected by the spool of FIG. 19.

FIG. 19 shows a spool provided with a read-out mechanism which reads out the depth SN of the cut-out formed on a film F shown in FIG. 18. When film F is wound around the spool with the initial perforation engaged by pawl 81, flap 82 is closed so that resistor band 157 is bought into pressure contact on elastic electrode 159. As film F is sandwitched by resistor band 157 and elastic electrode 159 at this time, electric contact is effected between the resistor band and the elastic electrode by the depth SN of the cut-out of the film. As a consequence, the resistance of resistor band 159 corresponding to the depth SN is applied to an exposure control circuit through terminals 150 and 153 as information of film speed of the film.

Figure 21:
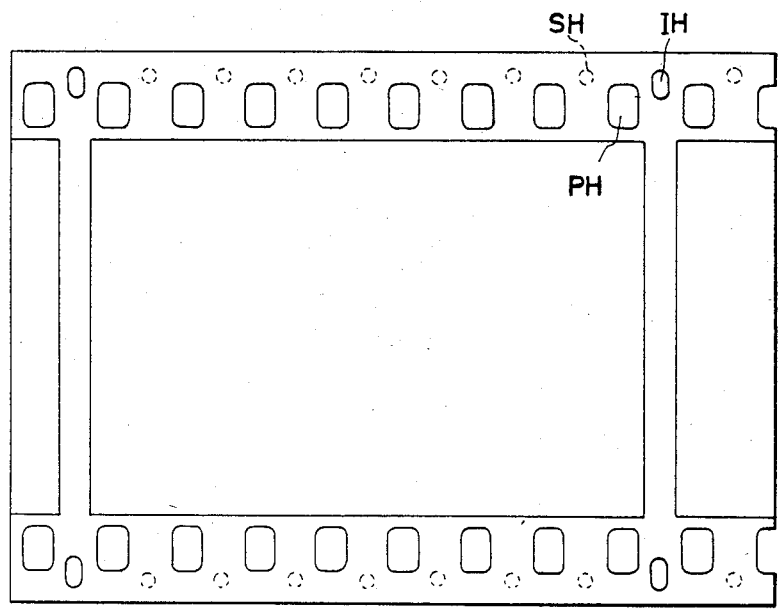
FIG. 21 is a plan view of a still another film according to the present invention.

FIG. 21 shows the appearance of the film according to a still further embodiment of the present invention. The film is adapted for use in a camera that automatically controls exposure in accordance with detection of film sensitivity frame by frame. Besides sprocket holes PH at both sides, the film is provided with a film positioning hole IH, one for each frame, which is utilized for the positioning of the film relative to the exposure aperture of the camera, and which may preferrably have a shape different from signal perforations SH that represent a film sensitivity value by a digital code. The portions between adjacent sprocket holes PH, i.e. the portions indicated by small circles of a broken line, may be perforated or left unperforated to represent a film sensitivity value in a digital form by means of a digital code. This digitally coded signal is formed at each frame portion. This arrangement enables obtainment of film sensitivity data at any time without having to store or memorize it.

Figure 22:
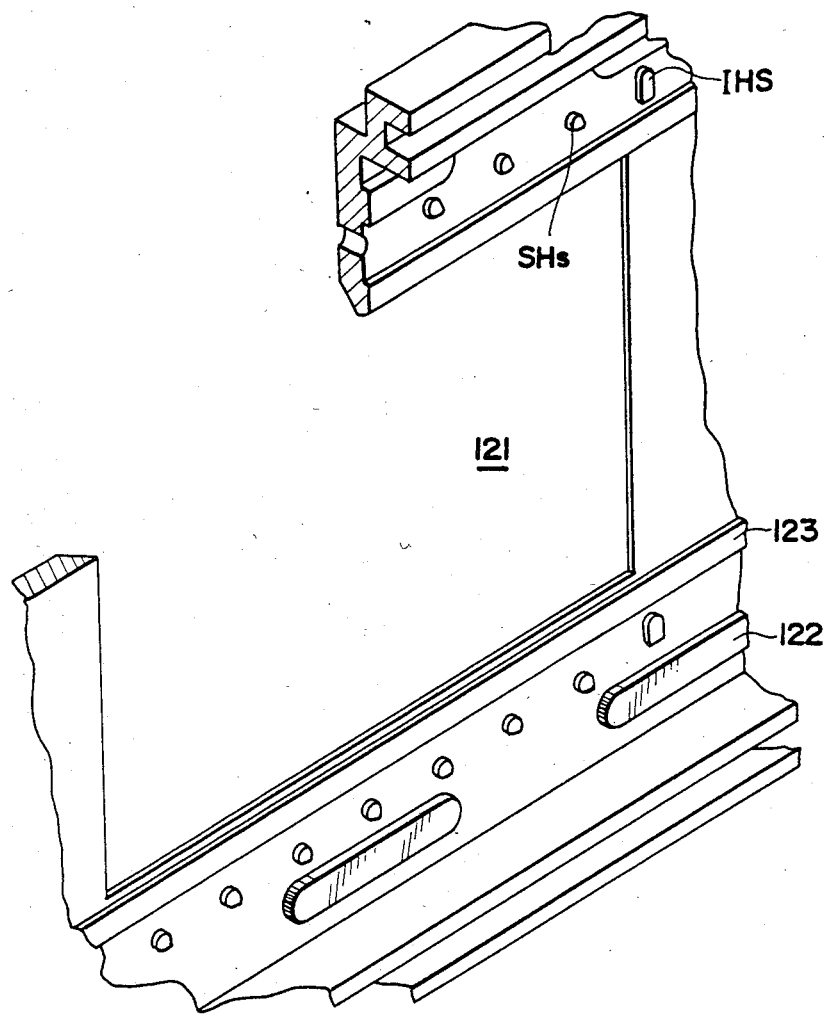
FIG. 22 is a fragmentary perspective view of a camera structure according to the present invention which is adapted to read out the signal holes and the positioning holes on the film of FIG. 21.

With reference to FIG. 22 showing fragmentarily the essential portion of a camera according to the present invention adapted for use with the film shown in FIG. 21, at the rear surface of the camera body are provided positioning hole detecting pin IHs corresponding to positioning hole IH and signal perforation detecting pins SHs corresponding to signal perforations. As in conventional cameras, the camera rear surface is formed with a frame for exposure aperture 121, film guide rails 122 for restricting the vertical position of the film while it is transported laterally, and film abutting surfaces 123 for positioning the light sensitive plane of the film at the focal plane of the camera objective lens (not shown).

Figure 23:
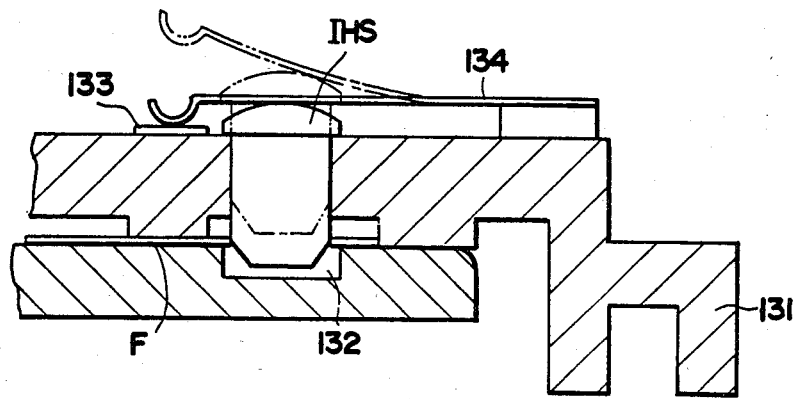
FIGS. 23 and 24 are respectively cross sectional views of the reading portions of the camera structure of FIG. 22.

FIG. 23 is an enlarged cross-sectional view showing a switch mechanism operated by positioning hole detecting pin IHs. Reference numeral 131 designates a camera body, 132 a film pressure plate, F a film and 133 a conductive piece. Resilient contact piece 134 is moved by positioning hole detecting pin IHs in the upward and downward direction in the plane of the drawing to generate a signal in dependence on whether it is in contact with a conductive piece or not. When the film shown in FIG. 21 is loaded, positioning hole detecting pin IHs moves to the position shown by a solid line to bring conductive piece 133 into contact with resilient contact piece 134 and turn on the switch only where positioning hole IH comes into alignment with pin IHs, because pin IHs is configured not to enter signal perforation SH with its end, and is disposed at a position where it can not align with sprocket holes PH in the vertical position.

Figure 24:
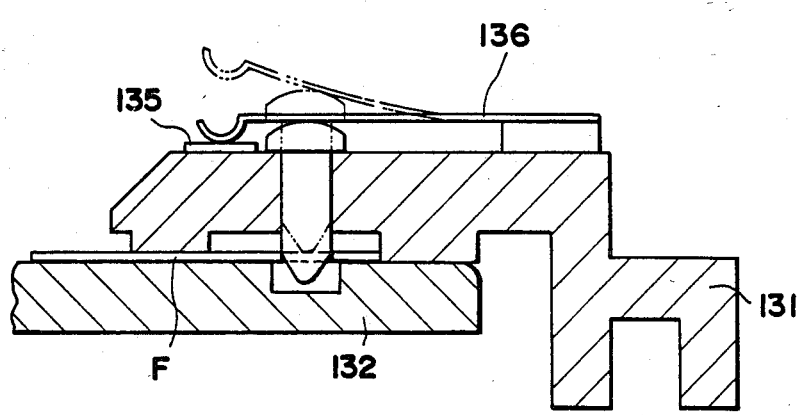

FIG. 24 is an enlarged cross-sectional view of a switch mechanism to be operated by signal perforation detecting pin SHs. Reference numeral 131 designates a camera body, 132 a film pressure plate and 135 a conductive piece. Contact piece 136 is in contact with or disengaged from conductive piece 135 to turn on or off the switch in response to the position of signal perforation detecting pin SHs. When an encoded portion is perforated with the portion aligning with pin SHs, the end of pin SHs enters signal perforation SH, as shown by a solid line in FIG. 24, to bring contact piece 136 into contact with conductive piece 135 to turn on the switch. When the encoded portion is not perforated, the end of signal perforation detecting pin SHs is pushed by the film plane to push contact piece 136 upwards and disengage it from conductive piece 135 to turn off the switch. The switch mechanism shown in FIG. 23 so as to be operated by positioning hole detecting pin IHs, may be utilized for providing a signal for stopping film wind-up operation when the mechanism is provided in a camera that has a motor driven film wind-up device. In the present invention, the signal generated by the switch mechanism is utilized for initiating reading-out operation of a read-out circuit which detects the signals derived from signal perforations SH.

It will be apparent to those skilled in the art that although mechanically operated switch mechanisms have been described with reference to FIGS. 22 to 24, they can be substituted by other types of switch mechanisms, such as an electric switch mechanism including a pair of contacts interposed by the film, or a photoelectric switch mechanism including a light source and a photocell arranged to receive the light through the hole or perforation.

What is claimed is:

1. Camera apparatus for use with a film cartridge formed with five first areas and a second area, said first area having weights of 4, 2, 1, $\frac{2}{3}$ and $\frac{1}{3}$, respectively, and being conductive and non-conductive with said second area in dependence upon the APEX value Sv of film speed of a film contained in said film cartridge, said camera apparatus comprising:
   means for detecting said first areas which are conductive with said second area;
   means for calculating the summation of the weights of the first areas detected by said detecting means and adding a predetermined constant value to the summation to generate a first signal directly indicative of the APEX value of the film speed represented by said first areas;
   circuit means for receiving said first signal; and
   means for generating a second signal indicative of a particular film speed;
   means for determining whether none of, or at least one of, said first areas is conductive with said second area; and
   a selector for feeding said first signal to said circuit means when it is determined by said determining means that at least one of said first areas is conductive with said second area and feeding said second signal to said circuit means when it is determined by said determining means that none of said first areas is conductive with said second area.

2. Camera apparatus as defined in claim 1, wherein said second signal generating means includes means for manually setting said particular film speed.

3. Camera apparatus for use with a film cartridge formed with five first areas and a second area, said first areas having weights of 4, 2, 1, $\frac{2}{3}$ and $\frac{1}{3}$, respectively, and being conductive and non-conductive with said second area in dependence upon the APEX value Sv of film speed of a film contained in said film cartridge, said camera apparatus comprising:
   means for detecting said first areas which are conductive with said second area;
   means for calculating the summation of the weights of the first areas detected by said detecting means and adding a predetermined constant value to the summation to generate a first signal directly indicative of the APEX value of the film speed represented by said first areas;
   circuit means for receiving said first signal;
   means for generating a second signal indicative of a particular film speed;
   means for determining whether none of, or at least one of, said first areas with weights of $\frac{2}{3}$ and $\frac{1}{3}$ is conductive with said second area;
   a selector for feeding said first signal to said circuit means when it is determined by said determining means that at least one of said first areas with weights of $\frac{2}{3}$ and $\frac{1}{3}$ is conductive with said second area and feeding said second signal to said circuit means when it is determined by said determining means that none of said first areas with weights of $\frac{2}{3}$ and $\frac{1}{3}$ is conductive with said second area.

4. Camera apparatus as defined in claim 3, wherein said second signal generating means includes means for manually setting said particular film speed.

5. In a camera for use with a film cartridge having five first areas which correspond to bits of digital codes representing APEX values Sv of film speeds, three of said first areas having weights of 4, 2 and 1 respectively, whereas the remaining two of said first areas having weights of $\frac{2}{3}$ and $\frac{1}{3}$ respectively, and at least one of said two first areas with weights of $\frac{2}{3}$ and $\frac{1}{3}$ being conductive with a second area adjacent to said five first areas for all film speeds of available film, a code detection device comprising:
   means for reading the digital code on said five first areas to generate a first signal indicative of the film speed represented by said digital code;
   means for generating a second signal indicative of a particular film speed;
   means for determining whether none of, or at least one of, said first areas with weights of $\frac{2}{3}$ and $\frac{1}{3}$ is conductive with said second area;
   selector means for allowing passage of said first signal when it is determined by said determining means that at least one of said first areas with weights of $\frac{2}{3}$ and $\frac{1}{3}$ is conductive with said second area and allowing passage of said second signal when it is determined by said determining means that none of first areas with weights of $\frac{2}{3}$ and $\frac{1}{3}$ is conductive with said second area; and
   circuit means for receiving either one of said first and second signals from said selector means.

6. A code detection device as defined in claim 5, wherein said second signal generating means includes means for manually setting said particular film speed.

7. A code detection device as defined in claim 5, wherein said circuit means includes exposure control means for controlling an exposure in accordance with either one of said first and second signals from said selector means.

8. A code detection device as defined in claim 5, wherein said circuit means includes means for indicating film speed in accordance with either one of said first and second signals from said selector means.

9. A code detection device as defined in claim 5, further comprising means for indicating the result of the determination by said determining means so that it can be determined which of said first and second signals is allowed to pass through said selector means.

10. In a camera adapted to receive a film cartridge having a plurality of first areas which correspond to bits of digital codes representing APEX values Sv of film speeds and which are selectively conductive and non-conductive with a second area in dependence upon the APEX value of Sv of film speed of a film contained in said film cartridge, a code detection device comprising:
    means for determining whether at least two of said first areas corresponding to predetermined bits of said digital codes are conductive or non-conductive with said second area, with said film cartridge received in said camera;
    means responsive to the determination by said determining means for generating a signal of predetermined film speed which is representative of one of the film speed ranges within which the film speed of the film contained in said film cartridge received in said camera resides;
    circuit means for receiving said signal of predetermined film speed; and
    said signal generating means includes:
    first means responsive to the determination by said determining means for generating a signal of one of the film speed ranges within which the film speed of the film contained in said film cartridge received in said camera resides; and second means for generating said signal of said predetermined film speed in accordance with said signal of the film speed range.

11. A code detection device as defined in claim 10, wherein said determining means is adapted to generate a digital signal which varies with the conduction and non-conduction of said at least two said first areas with said second area.

12. A code detection device as defined in claim 11, wherein said first means includes decoder means for converting said digital signal from said determining means into said signal of the film speed range which is in the form of a digital signal, and said second means includes a digital-to-analog converter for converting said signal of the film speed range into an analog signal, which is said signal of the predetermined film speed.

13. In a camera adapted for use with a film cartridge having five first areas with weights of 4, 2, 1, ⅔ and ⅓ respectively, and a second area, said first areas being conductive or non-conductive in accordance with the APEX value Sv of film speed of a film contained in said film cartridge, a code detection device comprising:

means for determining whether at least two of said first areas with weights of 4, 2 and 1 are conductive or non-conductive with said second area, with said film cartridge received in said camera;

means responsive to the determination by said determining means for generating a signal of predetermined film speed representative of one of the film speed ranges within which the film speed of the film contained in said film cartridge resides; and circuit means for receiving said signal of predetermined film speed; and said signal generating means includes:

first means for selectively generating one of a number of predetermined digital signals in accordance with the determination by said determining means; and second means for generating said signal of predetermined film speed in accordance with the digital signal from said first means.

14. A code detection device as defined in claim 13, wherein said signal generating means includes:

first means for selectively generating one of a number of predetermined digital signals in accordance with the determination by said determining means; and second means for generating said signal of predetermined film speed in accordance with the digital signal from said first means.

15. A code detection device as defined in claim 13, wherein said signal generating means includes:

first means for selectively generating one of a number of predetermined digital signals in accordance with the determination by said determining means; and second means for generating said signal of predetermined film speed in accordance with the digital signal from said first means.

16. A series of film cartridges for films of various film speeds, each film cartridge of said series comprising:

a housing containing one of said films and having on its outer peripheral wall first to sixth areas which extend perpendicular to the direction in which the film is pulled out of said film cartridge;

a digital code pattern provided on said second to sixth areas such that said second to sixth areas correspond to the bits of said digital code, respectively, said second to sixth areas having weights of 1, 2, 4, ⅓ and ⅔ in terms of the APEX value Sv, respectively; and means for selectively making said second to sixth areas conductive and non-conductive with said first area in accordance with the APEX value of the film speed of the film contained in said housing, to allow detection of said second to sixth areas being conductive with said first area from the exterior of said film cartridge, at least one of said fifth and sixth areas being conductive with said first area for every film speed of said series of film cartridges, whereby conduction of at least one of said fifth and sixth areas with said first area is the indication of the film cartridge of said series.

17. A series of film cartridges as defined in claim 16, wherein said means for selectively making includes a conductive member extending over said first through sixth areas and one or more electrically insulative layers selectively disposed on said second to sixth areas to make one or more of said second to sixth areas non-conductive with said first area in accordance with the APEX value Sv of the film speed of the film contained in said housing.

* * * * *

UNITED STATES PATENT AND TRADEMARK OFFICE
CERTIFICATE OF CORRECTION

PATENT NO. : 4,588,272

DATED : May 13, 1986

INVENTOR(S) : HODA ET AL

It is certified that error appears in the above-identified patent and that said Letters Patent are hereby corrected as shown below:

[56] References Cited

FOREIGN PATENT DOCUMENTS

"5785053  5/1982  Japan ......354/21"  should read

--57-85053  5/1982  Japan.......354/21--

Signed and Sealed this

Fourth Day of November, 1986

[SEAL]

Attest:

DONALD J. QUIGG

Attesting Officer

Commissioner of Patents and Trademarks